US012609051B1

(12) United States Patent
Quick et al.

(10) Patent No.: US 12,609,051 B1
(45) **Date of Patent: *Apr. 21, 2026**

(54) DUPLEX LABEL WITH SINGLE SIDED INTERMEDIATE LINER

(71) Applicant: Ward-Kraft, Inc., Fort Scott, KS (US)

(72) Inventors: Phil Quick, Fort Scott, KS (US); Roger Kraft, Fort Scott, KS (US); Greg Fess, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,211

(22) Filed: Aug. 11, 2022

Related U.S. Application Data

(63) Continuation-in-part of application No. 17/578,656, filed on Jan. 19, 2022, now Pat. No. 12,374,238.

(60) Provisional application No. 63/260,184, filed on Aug. 11, 2021, provisional application No. 63/138,908, filed on Jan. 19, 2021.

(51) Int. Cl.
*G09F 3/02* (2006.01)
*G09F 3/10* (2006.01)

(52) U.S. Cl.
CPC .............. *G09F 3/0288* (2013.01); *G09F 3/10* (2013.01); *G09F 2003/0222* (2013.01); *G09F 2003/0257* (2013.01)

(58) Field of Classification Search
CPC ........... G09F 3/0288; G09F 2003/0222; G09F 2003/023; G09F 2003/0257
See application file for complete search history.

(56) References Cited

U.S. PATENT DOCUMENTS

| | | | |
|---|---|---|---|
| 5,704,648 | A | 1/1998 | Brown et al. |
| 6,039,356 | A | 3/2000 | Warther et al. |
| RE39,100 | E | 5/2006 | Raming |
| 8,261,477 | B1 | 9/2012 | Wilkinson et al. |
| 8,322,061 | B1 | 12/2012 | Kraft |
| 8,857,943 | B2 | 10/2014 | Raming |
| 9,870,724 | B1 | 1/2018 | Gorp et al. |
| 10,604,294 | B1 * | 3/2020 | Valenti, Jr. ............ G09F 3/0289 |

(Continued)

FOREIGN PATENT DOCUMENTS

| | | |
|---|---|---|
| GB | 2093794 A | 9/1982 |

OTHER PUBLICATIONS

Office Action, dated Aug. 22, 2024, 9 pages, issued in U.S. Appl. No. 17/578,656.

(Continued)

*Primary Examiner* — Patricia L. Nordmeyer
(74) *Attorney, Agent, or Firm* — AVEK IP, LLC

(57) ABSTRACT

Duplex label system and methods of using same. A duplex label system comprises a first face ply, a second face ply, and a liner ply. Lines of weakness extend through the duplex label system and form a first perimeter portion, a second perimeter portion, a first central portion, and a second central portion. The first perimeter portion has an outboard portion of the first face ply outboard the lines of weakness. The second central portion comprises each of inboard portions of the second face ply and the liner ply inboard the lines of weakness. Disassociation of the second perimeter portion from the duplex label system exposes the first adhesive layer associated with the first perimeter portion for securing the first perimeter portion to a substrate.

17 Claims, 16 Drawing Sheets

(56) References Cited

U.S. PATENT DOCUMENTS

| | | | | |
|---|---|---|---|---|
| 2004/0017076 | A1* | 1/2004 | Raming | B65C 1/021 283/81 |
| 2006/0091671 | A1 | 5/2006 | Raming | |
| 2006/0233994 | A1 | 10/2006 | Hodsdon et al. | |
| 2009/0092781 | A1 | 4/2009 | Guzi | |
| 2010/0259037 | A1 | 10/2010 | Hanrahan et al. | |
| 2011/0233095 | A1 | 9/2011 | Seidl | |
| 2012/0100328 | A1 | 4/2012 | Uribe | |
| 2012/0234481 | A1 | 9/2012 | Raming | |
| 2013/0249205 | A1 | 9/2013 | Bellmyer et al. | |
| 2014/0138277 | A1* | 5/2014 | Raming | G09F 3/0289 428/137 |
| 2014/0367472 | A1 | 12/2014 | Weidauer et al. | |
| 2016/0180749 | A1 | 6/2016 | Sato | |
| 2016/0293063 | A1 | 10/2016 | Weiner et al. | |

OTHER PUBLICATIONS

Notice of Allowance, dated Apr. 7, 2025, 9 pages, issued in U.S. Appl. No. 17/578,656.

* cited by examiner

DUPLEX LABEL WITH SINGLE SIDED INTERMEDIATE LINER

CROSS-REFERENCE TO RELATED APPLICATIONS

This application is a continuation-in-part of U.S. Nonprovisional patent application Ser. No. 17/578,656 filed Jan. 19, 2022, which claims priority to U.S. Provisional Patent Application No. 63/138,908, filed Jan. 19, 2021. This application also claims priority to U.S. Provisional Application, Ser. No. 63/260,184 filed Aug. 11, 2021. The disclosure of each of these applications are hereby incorporated by reference in their entirety.

FIELD OF THE DISCLOSURE

The disclosure relates generally to the field of duplex labels. Specifically, the disclosure relates to labels having a single sided liner ply located between two or more printable face plies.

BRIEF SUMMARY OF INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

Duplex label system and methods of using same are disclosed herein. In an embodiment, a duplex label system comprises a first face ply, a second face ply, and a liner ply. The liner ply has a top side and a bottom side. The top side is releasably secured to the first face ply using a first adhesive layer and the bottom side is fixedly secured to the second face ply using a second adhesive layer. The duplex label system has lines of weakness extending through the duplex label system. The lines of weakness form a first central portion, a first perimeter portion, a second central portion, and a second perimeter portion. The first central portion has an inboard portion of the first face ply inboard the lines of weakness. The first perimeter portion has an outboard portion of the first face ply outboard the lines of weakness. The second central portion comprises each of inboard portions of the second face ply and the liner ply inboard the lines of weakness. The second perimeter portion comprises each of outboard portions of the second face ply and the liner ply outboard the lines of weakness. Disassociation of the second perimeter portion from the duplex label system exposes the first adhesive layer associated with the first perimeter portion for securing the first perimeter portion to a substrate. The first central portion and the second central portion are collectively removable from the substrate such that the first perimeter portion remains secured to the substrate. The inboard portion of the first face ply is adhesively securable to a second substrate after the inboard portion of the first face ply is separated from the inboard portion of the liner ply and the second central portion.

In another embodiment, a duplex label system comprises a first face ply, a second face ply, and a liner ply having a top side and a bottom side. The top side is secured to the first face ply using a first adhesive layer and the bottom side is secured to the second face ply using a second adhesive layer. Lines of weakness extend through the duplex label system. The lines of weakness form a first central portion, a first perimeter portion, a second central portion, and a second perimeter portion. The first central portion comprises an inboard portion of the first face ply inboard the lines of weakness. The first perimeter portion comprises an outboard portion of the first face ply outboard the lines of weakness. The second central portion comprises each of inboard portions of the second face ply and the liner ply inboard the lines of weakness. The second perimeter portion comprises each of outboard portions of the second face ply and the liner ply outboard the lines of weakness. Disassociation of the second perimeter portion from the duplex label system exposes the first adhesive layer associated with the first perimeter portion for securing the first perimeter portion to a substrate. The first central portion and the second central portion are collectively removable from the substrate such that the first perimeter portion remains secured to the substrate. The inboard portion of the second face ply is adhesively securable to a second substrate after the inboard portion of the second face ply is separated from the inboard portion of the liner ply and the first central portion. A top area of the duplex label system has a plurality of curved surfaces. A tear strip extends across the duplex label system laterally and adjacent the top area.

In yet another embodiment, a method of using a duplex label system comprises providing the duplex label system, comprising a first face ply, a second face ply, and a liner ply having a top side and a bottom side. The top side is secured to the first face ply using a first adhesive layer and the bottom side is secured to the second face ply using a second adhesive layer. Lines of weakness extend through the duplex label system. The lines of weakness form a first central portion, a first perimeter portion, a second central portion, and a second perimeter portion. The first central portion comprises an inboard portion of the first face ply inboard the lines of weakness. The first perimeter portion comprises an outboard portion of the first face ply outboard the lines of weakness. The second central portion comprises each of inboard portions of the second face ply and the liner ply inboard the lines of weakness. The second perimeter portion comprising each of outboard portions of the second face ply and the liner ply outboard the lines of weakness. Disassociating the second perimeter portion from the duplex label system to expose the first adhesive layer associated with the first perimeter portion. The method comprises securing the first perimeter portion to a substrate and disassociating the first central portion and the second central portion from the substrate along the lines of weakness. The method includes separating the inboard portion of the first face ply from the second central portion and the inboard portion of the liner ply. The method comprises adhesively securing the inboard portion of the first face ply to a second substrate.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

Figure 1:
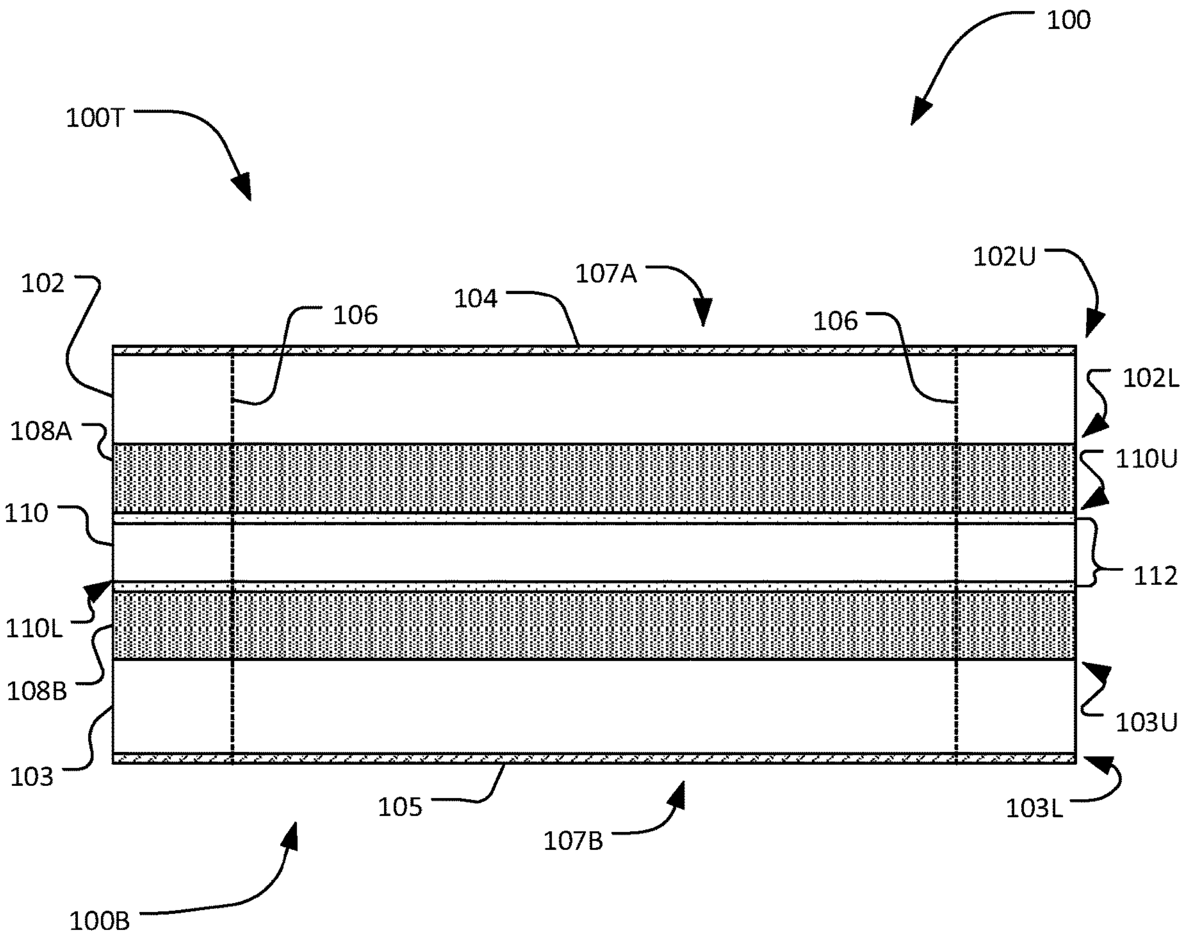
FIG. 1 is a schematic representation of a duplex label employing an intermediate liner, according to an embodiment of the present disclosure.

The disclosure relates generally to a duplex label having an intermediate liner usable in a plethora of applications requiring the attachment of a label to a substrate, such as packages, letters, medications, et cetera. These applications and the use of the duplex label therewith are discussed in-turn. The duplex label with intermediate liner embodiments described herein may have a plurality of face plies that may be separable and may each receive printed matter.

As is known, a shipping label is adhered to a package and identifies the sender and recipient of the package. Conventional shipping labels have a front face for the printing of indicia and a back face that is adhered to the package. Traditionally, the back face is covered with adhesive, and a liner is removably secured to the back face via this adhesive. As is known, during transportation or otherwise before the label is adhered to a substrate (e.g., a package or other similar surface), the liner covers the adhesive. This is to ensure that the label does not undesirably stick to objects (e.g., other labels, print heads, and/or other components of apparatus used to make and/or print the label) other than the substrate to which the label is to be adhered. Prior to use, the liner is removed, either by hand or otherwise, to expose the adhesive, and the label (specifically, the face ply thereof) is adhered to the package being delivered using the exposed adhesive.

A traditional duplex label is a label with a single face ply that can receive indicia (e.g., printed matter, barcodes, images, etc.) on both a front side and a back side. In some cases, conventional duplex labels are constructed of multiple face plies. For example, conventional duplex labels may have a first face ply that may receive a first set of printed indicia, and a second face ply that may receive a second set of indicia. These two face plies are then secured together to form the prior art duplex label. Accessing the second set of indicia (which is normally hidden from view by the first face ply and the surface to which the prior art label is adhered to) when the prior art duplex label is adhered may be problematic, however. To access the hidden indicia, the prior art multi-ply duplex labels must be removable, in some fashion, from the adhered surface. Some prior art duplex labels accomplish this by employing a removable adhesive or are designed to be adhered only to specific surface types which they are capable of being removed from, such as non-porous surfaces. These specific configurations limit the usage and flexibility of the prior art duplex labels.

Another way the prior art duplex labels may reveal hidden indicia is through the use of removable label portions that may be removed along perforations, die cuts, lines of weakness, et cetera. The indicia on the removed portion may then be available for viewing by the user. However, these removable portions are not re-adherable, thus limiting their flexibility. Further, some traditional multi-ply duplex labels utilize multiple liner layers, which disadvantageously increase the cost, waste, and size of the traditional labels.

It may be advantageous to have a multi-ply duplex label that does not suffer from the disadvantages associated with conventional multi-ply duplex labels. The present disclosure provides for such a label that addresses at least some of the problems associated with prior art duplex labels.

Focus is directed now to FIG. 1, which shows an example embodiment 100 of a duplex (e.g., double sided printed), multi-ply label having an intermediate liner 110, according to the teachings of the present disclosure. The illustrated label 100 has a top side 100T and a bottom side 100B. As discussed herein, indicia may be printed on the top side 100T and/or the bottom side 100B, and the label 100 may be adhered to a substrate 50 (FIGS. 4A-4E) (e.g., a cardboard box, a piece of paper, an envelope, a porous surface, a non-porous surface, and/or any other suitable surface) at the bottom side 100B. A portion of the label 100 may be removable from the rest of the label 100 sometime after the label 100 is adhered to the substrate 50. Due to the intermediate liner ply 110, the face plies of the label 100 may be separable from each other. Such a configuration may allow for the reapplication of one of the face plies to the same or another substrate 50. In this way, the indicia that was previously hidden (e.g., by nature of being sandwiched between the topmost face ply and the substrate 50) may be revealed to a user.

An example application of the label 100 may be a label containing shipping information indicia on a top side 100T and return shipping information indicia on a back side 100B. The label 100 may be adhered to a substrate 50 (e.g., a package to be shipped) with the shipping information indicia being visible. The receiver of the package may separate one or more portions (e.g., a first central portion 107A and a second central portion 107B, as discussed herein) of the label 100 from the rest of the label 100. The package receiver may then separate the one of the face plies from the intermediate liner ply 110 and apply the removed portion to the same or another substrate 50. In this way, the previously hidden return shipping indicia may now be displayed.

In more detail, and going from the label top side 100T to the label back side 100B, the label 100 may have a first face stock 102, which may have an upper side 102U and a lower side 102L. The first face stock 102 may comprise a solitary ply 102, made, for example, of paper. This face stock 102 may also be referred to herein as a face ply to indicate that the face ply comprises a solitary ply. Alternately, in other embodiments, the face stock 102 may contain more than one ply. In other embodiments still, the face stock 102 may comprise a film (e.g., a clear plastic film) or other printable substrate. In essence, the first face ply 102 may be any suitable material that is desired.

The first face ply 102, at its upper side 102U, may be provided with a topcoat 104. The topcoat 104 may be configured for the reception of printed (e.g., black and/or colored) indicia (e.g., content configured to be consumed by consumers). As such, the label 100 may be printed using any suitable technology now known or subsequently developed (such as a direct thermal printer, a thermal transfer printer, a laser printer, an inkjet printer, et cetera). In embodiments, the topcoat 104 may be foregone where the first face stock 102 is inherently printable. Alternately or additionally, the topcoat 104 may be located only where printing is desirable. For example, in embodiments, the topcoat 104 may be located only in the first central portion 107A of the label 100. The first central portion 107A may be defined by lines of weakness 106. The lines of weakness 106 may extend through each of the first face ply 102, the second face ply 103, and the intermediate liner layer 110. For instance, each of the first face ply 102, the second face ply 103, and the intermediate liner layer 110 may have corresponding lines of weaknesses 106.

A first adhesive layer 108A may be located on the face ply lower side 102L. The adhesive layer 108A may comprise any suitable (e.g., compatible with the type of printing used) adhesive now known or subsequently developed, such as hot melt adhesive, pressure sensitive adhesive, remoistenable adhesive, et cetera. In embodiments, the first adhesive layer 108A may adhesively couple the first face ply 102 to the intermediate liner layer 110.

The intermediate liner layer 110 may be sandwiched between the first adhesive layer 108A and a second adhesive layer 108B (which itself may be substantially the same or similar to the first adhesive layer 108A). The liner layer 110 may be a paper or other ply that has releasable properties. That is to say, at least one of the sides of the intermediate liner layer 110 may have properties which enable adhesive to be temporarily secured thereto. For example, the intermediate liner layer 110 may have one or more releasable coatings 112 having releasable properties located on the liner ply lower side 110L and/or the liner ply upper side 110U. In operation, the liner ply 110 may have releasable properties on the sides 110U, 110L where it is desired to temporarily secure the first face ply 102 and a second face ply 103, respectively, to the liner ply 110. In embodiments, the liner layer 110 may have indicia printed thereupon (e.g., printed prior to label 100 assembly, prior to application of the releasable coatings 112, etc.). This preprinted information on the liner layer 110 may be, for example, promotional (e.g., a coupon, an advertisement, etc.) or other indicia that may be available for viewing by a user after the first face ply 102 and/or the second face ply 103 is disassociated from the liner layer 110.

Like the first adhesive layer 108A, the second adhesive layer 108B may be any suitable adhesive now known or subsequently developed. In embodiments, the second adhesive layer 108B may be a different type of adhesive than the adhesive used in the first adhesive layer 108A.

The second face ply 103 may be substantially the same or similar to the first face ply 102, except that the second face ply 103 may be secured to the label 100 along the label bottom side 100B. Specifically, the second face ply 103 may be secured to the second adhesive layer 108B at a second face ply upper side 103U and may have a second printable coating 105 on the lower side 103L thereof. Like the first printable coating 104, the second printable coating 105 may receive printed matter or indicia. In embodiments, the second printable coating 105 is a different kind of coating than the first printable coating 105. The second face ply 103 may be temporarily secured to the intermediate liner ply 110 such that the second face ply 103 is removable by a user. While the second face ply 103 may not have adhesive on the lower side 103L thereof, the second face ply 103 may contact and remain in contact with the substrate 50 upon adhesion of the label 100 to the substrate because of the configuration of the label 100.

In embodiments, the size and/or shape of the second face ply 103, the second adhesive layer 108B, and the liner ply 110 may match that of the other label 100 layers (e.g., the first face ply 102). The second face ply 103 may have a second central portion 107B that generally corresponds (e.g., by having a similar shape, by having a similar size, etc.) to the first central portion 107A. In embodiments, the first central portion 107A may include portions of the first face ply 102 and the first adhesive layer 108A, and the second central portion 107B may include portions of the intermediate liner ply 110, the second adhesive layer 108B, and the second face ply 103. Like the first central portion 107A, the second central portion 107B may be delineated by the lines of weakness 106 (e.g., the lines of weakness 106 may extend through the label 100 layers and define both the first central portion 107A and the second central portion 107B). In some embodiments, the central portions 107A, 107B are defined by different sets of lines of weakness 106 that are not aligned with each other. In these cases, the central portions 107A, 107B may be of different sizes.

Figure 1A:
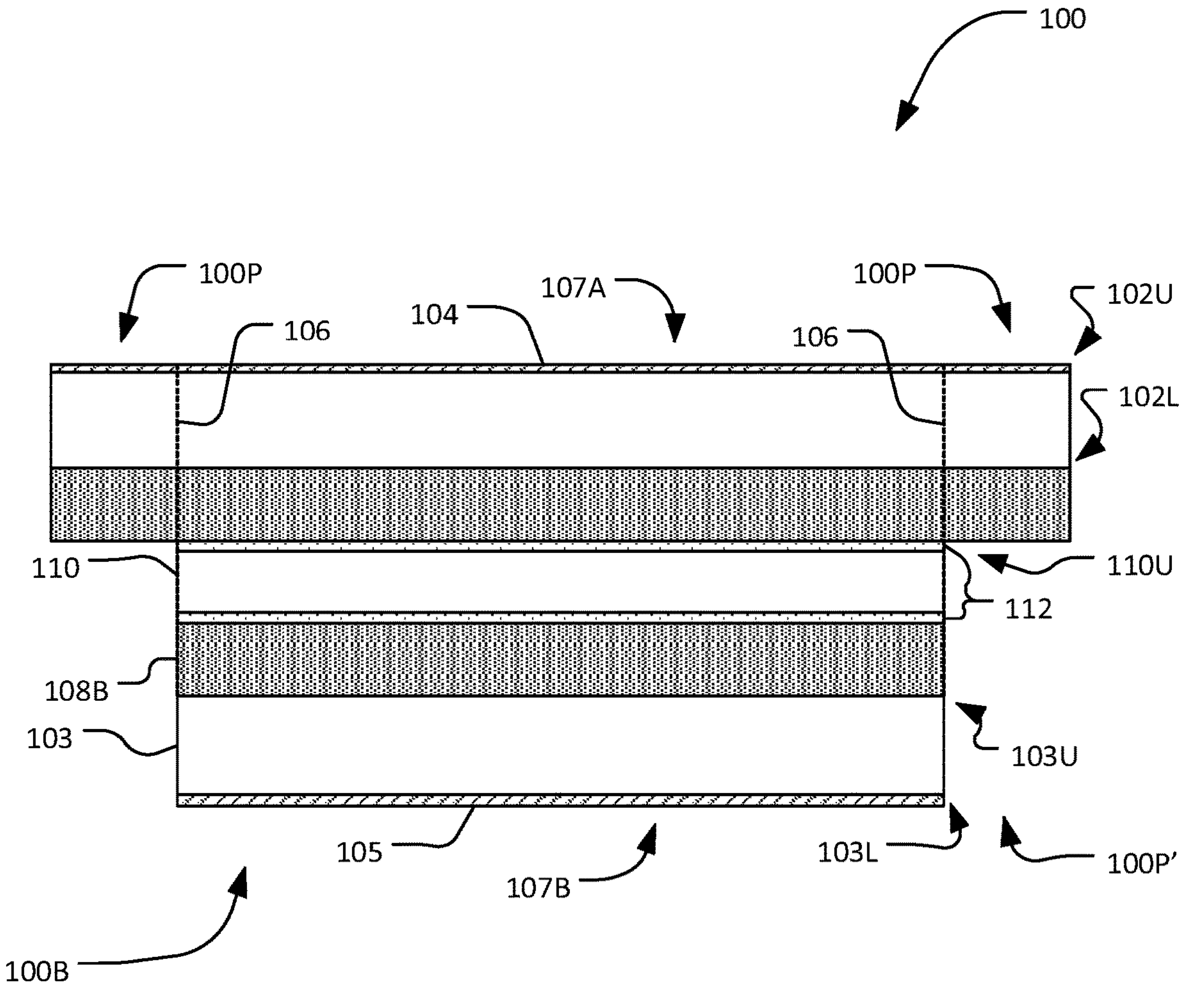
FIG. 1A is a schematic representation of the duplex label employing the intermediate liner of FIG. 1, in a use configuration.

In FIG. 1A, a use configuration is shown where portions of the label 100 are removed and the label 100 has been prepared for securement to the substrate 50. FIG. 1A also highlights an upper perimeter portion 100P and a lower perimeter portion 100P' of the label 100 (in FIG. 1A, a void is shown in place of the perimeter portion 100P' that has been removed to prepare the label 100 for securement to the substrate 50). The upper perimeter portion 100P may comprise the perimeter of the first face ply 102 and the first adhesive layer 108A, i.e., the area of the first ply 102 and the first adhesive layer 108A outboard the corresponding lines of weakness 106. The lower perimeter portion 100P' may comprise the perimeters (i.e., areas outboard the corresponding lines of weakness 106) of the intermediate liner ply 110 together with the releasable coatings 112, the second adhesive layer 108B, and the second face ply 103. In operation, the upper perimeter portion 100P may be the portion of the label 100 layers that resides outboard or surrounds the first central portion 107A, and the lower perimeter portion 100P' may be the portion of the label 100 layers that resides outboard or surrounds the second central portion 107B. Due to the lines of weakness 106, the perimeter portions 100P and 100P' may be separable from their respective central portions 107A and 107B. For example, the lines of weakness 106 may be exploited to remove the lower perimeter portion 100P' from the second central portion 107B, thus exposing the first adhesive layer 108A, as is shown in FIG. 1A. In this manner, the label 100 may be made ready for adherence to the substrate 50.

The lines of weakness 106 may be perforations, die cuts, folds, or any other suitable feature that enables separation of the central portions 107A, 107B from the perimeter portion 100P, 100P'. The lines of weakness 106 may extend through some or all of the layers of the label 100 (e.g., the face plies 102, 103, the adhesive layers 108A, 108B, the intermediate liner layer 110, et cetera), and may define the central portions 107A, 107B. Put another way, in embodiments, the central portions 107A, 107B may reside entirely within the lines of weakness 106. In operation, the lines of weakness 106 may be broken to allow a user to separate the central portions 107A, 107B from the rest of the label 100. In cases where the label 100 is adhered to the substrate 50 and the central portions 107A, 107B are thereafter separated from the label 100 along the lines of weakness 106, the rest of the label 100 (i.e., the perimeter portion 100P) (see FIG. 4C) may be left behind on the substrate 50. In some embodiments, there may be at least four lines of weakness 106 that define the central portions 107A, 107B (see FIG. 2), though this need not be the case. Alternate arrangements of lines of weakness 106 are contemplated herein, such as two lines of weakness 106 that extend the entire length of the label 100. In such an embodiment, the perimeter portions 100P, 100P' of the label 100 may consist of two strips on opposing sides of the central portions 107A, 107B. In other embodiments, the lines of weakness 106 define two or more central portions 107A and/or 107B within the label 100. In such cases, the lines of weakness 106 may allow for further separation of the central portions 107A and/or 107B from each other. In other embodiments still, the label 100 may have any suitable number, size, shape, and/or arrangement of central portions 107A, 107B and lines of weakness 106.

Generally, indicia printed on the first face ply 102 may be public indicia (e.g., shipping information, warning labels, etc.) and indicia printed on the second face ply 103 may be private indicia (e.g., packing lists, return labels, promotional offers, et cetera). In operation, the indicia on the first face ply 102 may be viewed by anyone who views the package to which the label 100 is adhered (i.e., after the lower perimeter portion 100P' is removed and the first adhesive layer 108A had been exposed). The recipient of the package may use the lines of weakness 106 to remove both the central portions 107A, 107B from the upper perimeter portion 100P of the label 100, and may then view the indicia printed on the second face ply 103.

In embodiments, because the second face ply 103 may have no adhesive on the lower side 103L thereof, the label 100 may be secured to the substrate 50 only by way of the first adhesive layer 108A that is exposed along the upper perimeter portion 100P. In this way, the central portions 107A, 107B themselves may not be fixedly secured to the substrate 50 when the label 100 is initially secured to the substrate 50. The central portions 107A, 107B may thereafter be readily removed from the both the rest of the label 100 and the substrate 50 along the lines weakness 106. The second face ply 103 may subsequently be removed from the intermediate liner ply 110 and the second face ply 103 may be adhered to the same or another substrate 50. In this way, the previously hidden indicia on the second face ply 102 may be exposed for viewing on the substrate 50. Further, in embodiments, the first central portion 107A may likewise be removed from the liner layer 110 and may be adhered to the same substrate 50 or a different substrate.

Figure 2:
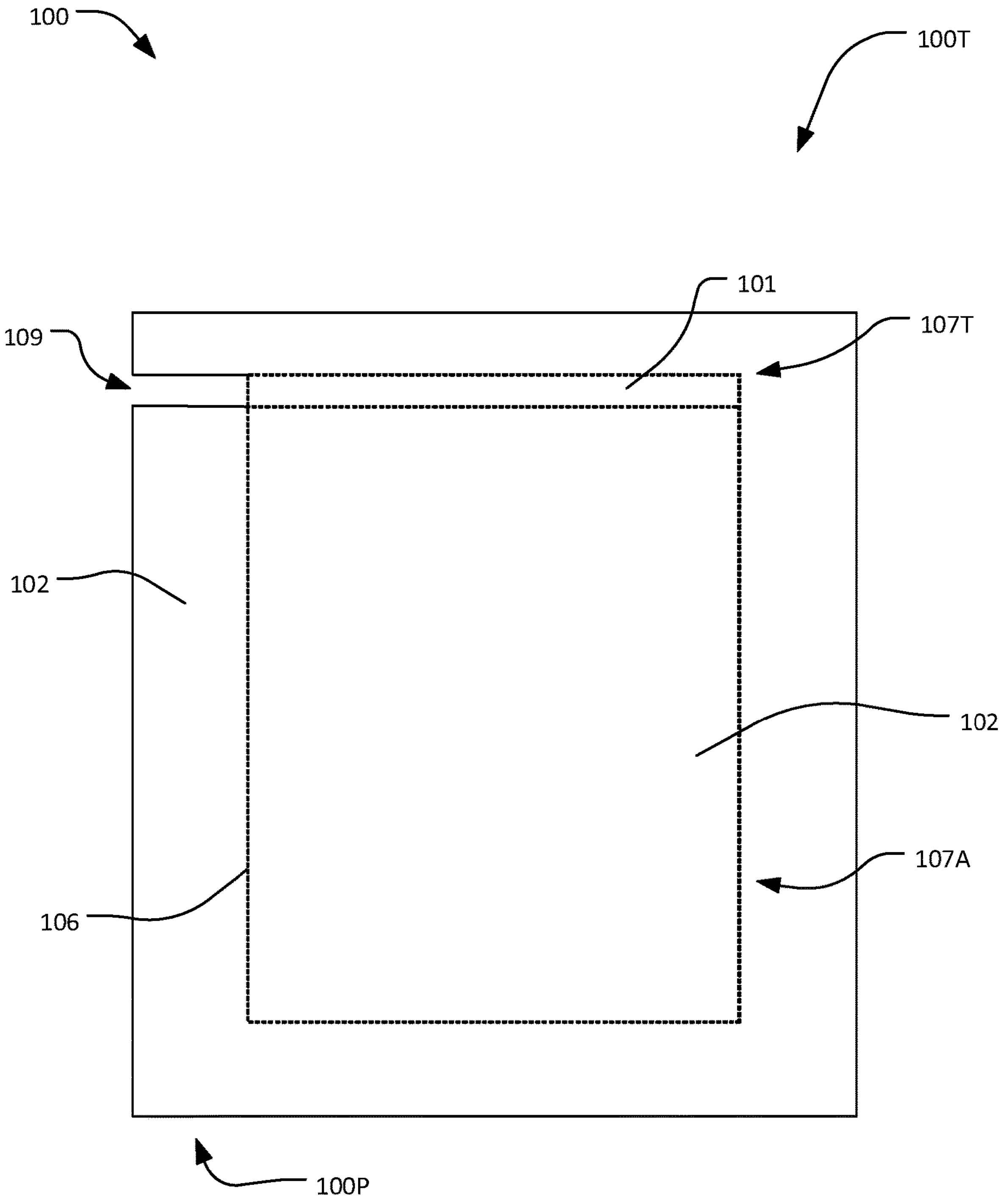
FIG. 2 is a top view of the duplex label employing the intermediate liner of FIG. 1.

Moving now to FIG. 2, the top side 100T of the label 100 is shown. The first central portion 107A may be delineated by the lines of weakness 106 in the first face ply 102 and the first adhesive layer 108A (or where the liner ply 110 and the second face ply 103 is of a similar size to the first face ply 102, perforations that extend through each of the first face ply 102, the liner ply 110, and the second face ply 103). The lines of weakness 106 may also delineate a tear away portion 101 located at a top area 107T of the first central portion 107A and/or the second central portion 107B (i.e., the lines of weakness 106 may form a tear away portion 101 in each of the face plies 102, 103, and the liner layer 110). In some embodiments, the tear away portion 101 may be coextensive with the central portions 107A, 107B (i.e., a width or height of the tear way portion 101 may be the same as a width or height of the central portions 107A, 107B). The tear away portion 101 may be configured to be removed from the label 100 to facilitate the removal of the central portions 107A, 107B from the upper perimeter portion 100P, after the label 100 is secured to the substrate 50. For example, removing the tear away portion 101 may allow a user to slip a finger or other tool underneath the central portions 107A, 107B and remove them from the rest of the label 100 via the lines of weakness 106. Without the tear away portion 101, a user may have more difficulty acquiring the necessary amount of space and/or leverage required to remove the central portions 107A, 107B from the perimeter portion 100P. In embodiments, there may be one or more tear away portions 101, and these one or more tear away portions 101 may be located adjacent the central portions 107A, 107B, such as a left, right, or bottom side of the central portions 107A, 107B.

Some embodiments, such as the one shown in FIG. 2, may have a gap 109, a width of which corresponds to the width of the tear away portion 101. The gap 109 may be an absence of one or more layers (e.g., all layers, all layers but the lower perimeter portion 100P', etc.) of the label 100 that leaves at least a portion of a side of the tear away portion 101 exposed. In operation, the combined tear away portion 101 and gap 109 may allow for the user to remove the central portions 107A, 107B from the label 100 after the label 100 is adhered to the substrate 50. The gap 109 may be on any suitable side (e.g., top, left, right, bottom) of the tear away portion 101 that facilitates access to the tear away portion 101 by the user. The gap 109 may also be any suitable shape or size to facilitate user access to the tear away portion 101. For example, in some embodiments, the gap 109 may have a width greater than a width of the tear away portion 101. In other embodiments, the gap 109 may be tapered such that the gap 109 is wider than the tear away portion 101 at an outboard edge of the perimeter portion 100P, and equals the width of the tear away portion 101 at the inboard edge of the perimeter portion 100P. In embodiments, in addition to the gap 109, or alternately, a tab may be provide to allow the user to conveniently pull the tear strip 101 so that the central portions 107A and 107B may be disassociated from the substrate 50.

Figure 2A:
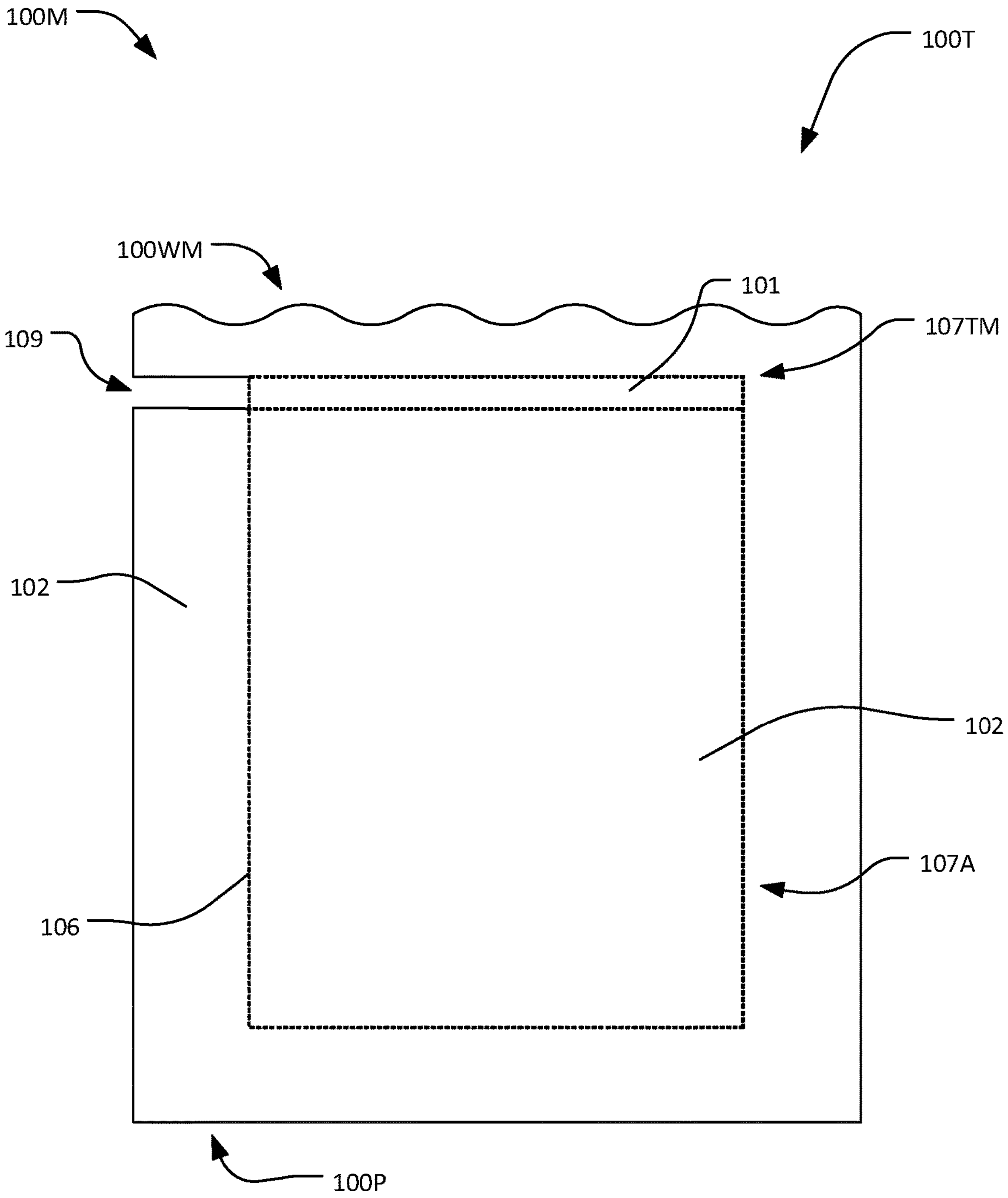
FIG. 2A is a top view of the duplex label employing the intermediate liner of FIG. 1, according to another embodiment.

FIG. 2A shows another embodiment 100M of the label 100. The label 100M may be identical to label 100, except as specifically noted and/or shown, or would be inherent. Corresponding reference numbers have been used to denote corresponding parts, though with any noted deviations. A primary difference between the label 100 and the label 100M may be that the label 100M may have modified top area 107TM. It has been found that from time to time, edges, and most commonly a top or forward edge, of conventional labels may get caught and/or torn when passing through machinery (e.g., a printer, an application machine, et cetera), particularly where the label is a multi-label layer of appreciable thickness (such as the label 100). In embodiment, instead of having a relatively straight top edge, the top area 107TM may have a shaped edge 100WM. The shaped edge 100WM may be any suitable non-straight shape, such as a wavy shape, a zig-zag shape, et cetera. In operation, the edge 100WM may provide less label surface area around the top area 107TM relative to a straight perimeter edge of the label 100. Because there may be less area of the label 100M (i.e., each of first, second, and liner plies) available for catching on machinery, the label 100M with the shaped edge 100WM may be less prone to jamming or tearing on equipment such as printers when compared to conventional labels. Applicant's experiments have shown that label 100M jams less often than multi-layer labels with a straight top edge. Other than the non-linear top edge 100WM, the label 100M may be identical to the label 100.

Figure 3:
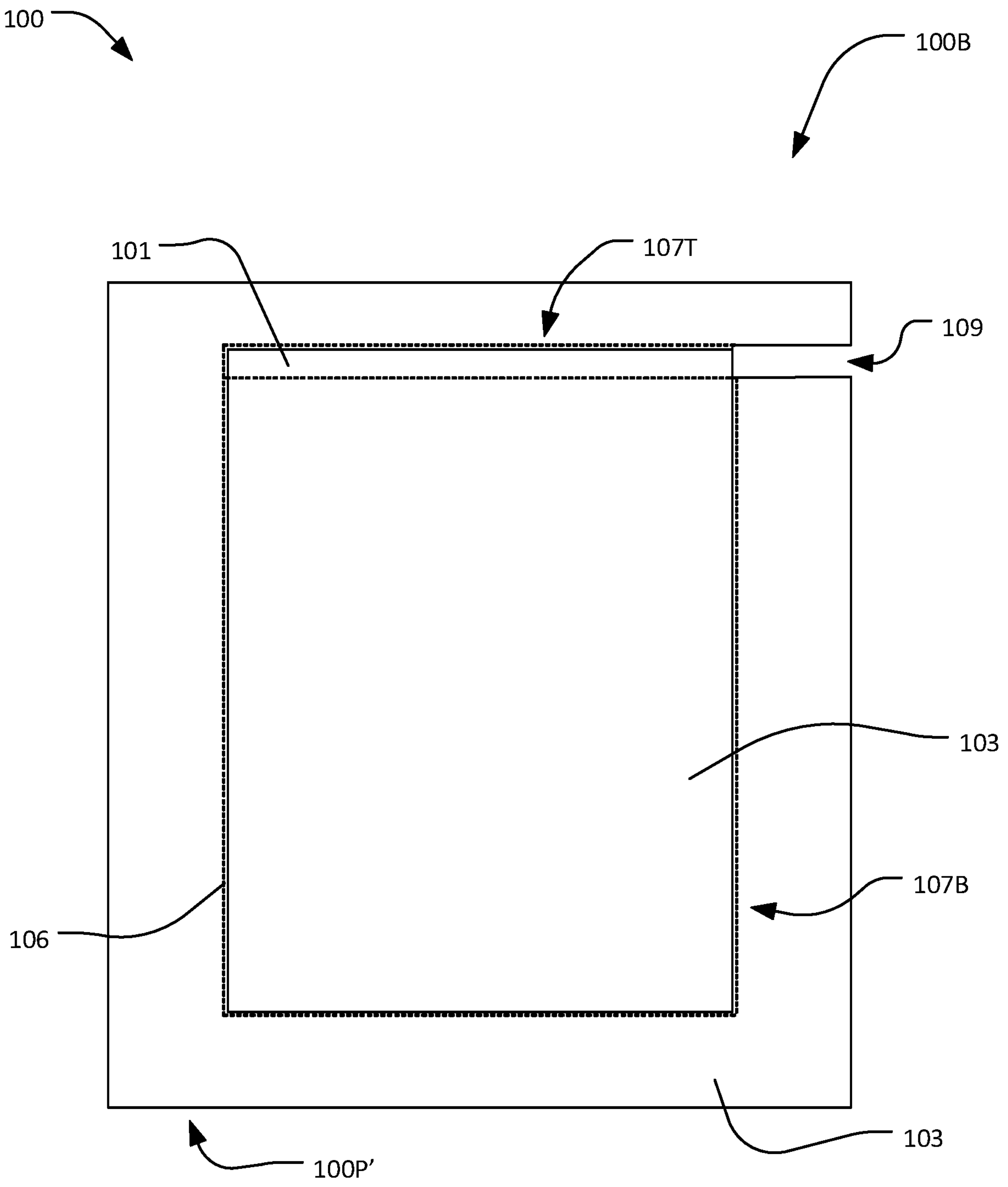
FIG. 3 is a bottom view of the duplex label employing the intermediate liner of FIG. 1.

FIG. 3 shows a bottom side of the label 100 before the lower perimeter portion 100P' is removed. Here, the lines of weakness 106 are seen bounding the second central portion 107B, and the tear away portion 101 resides at a top part 107T of the second central portion 107B. In embodiments, the lines of weakness 106 may be what facilitates the separation of the lower perimeter portion 100P' to expose the first adhesive layer 108A.

Figure 3A:
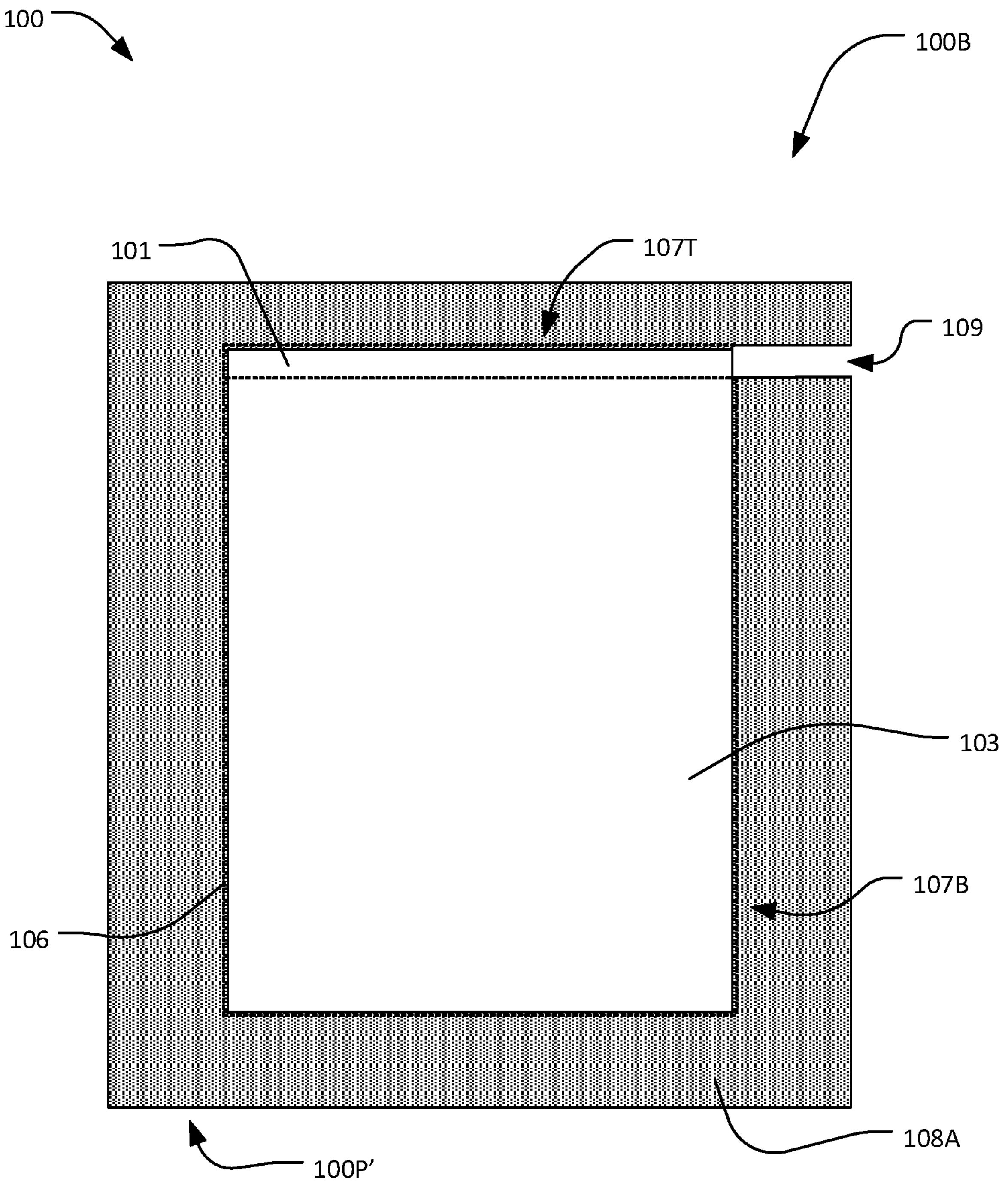
FIG. 3A is a bottom view of the duplex label employing the intermediate liner of FIG. 1, in the use configuration.

FIG. 3A shows a bottom side 100B view of the label 100 in the use configuration, i.e., after the lower perimeter portion 100P' has been removed. Here, the perimeter portion 100P of the first adhesive layer 108A is exposed (e.g., by virtue of the lower perimeter portion 100P', comprising portions of the second face ply 103, the liner layer 110, and the second adhesive layer 108B outboard the lines of weakness 106 being removed). The lines of weakness 106 in the first adhesive layer 108A are seen bounding the second face ply 103, and the tear away portion 101 resides at a top part 107T of the central portion 107B.

In embodiments, one or more (e.g., all) of the corners of the label 100 layers and/or the central portions 107A, 107B may be rounded or filleted. For example, some or all of the corners of the label 100 that are in the vicinity of the gap 109 and/or the tear away portion 101 may be rounded to facilitate user access thereto.

Figure 4A:
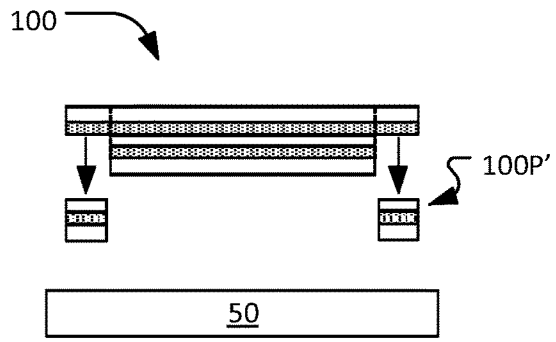
FIGS. 4A-4E are schematic representations of an example operation of the duplex label employing the intermediate liner of FIG. 1.
Figure 4B:
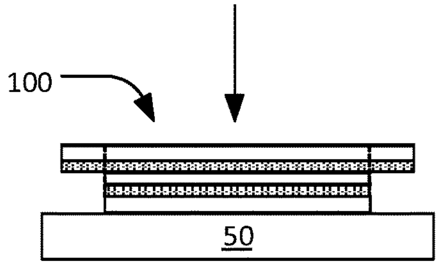

Attention is now directed FIGS. 4A-4E, where example operation of the duplex label 100 with intermediate liner 110 is illustrated. Sets of indicia may be printed on one or both of the face plies 102, 103 prior to adherence of the label 100 to a substrate 50. These sets of indicia may be printed simultaneously (i.e., with a single pass of the label 100 through a printer) or subsequently (i.e., with multiple passes through a printer). As shown in FIG. 4A, a user may prepare the label 100 for securement to the substrate 50 by removing the lower perimeter portion 100P'. Specifically, portions of the second face ply 103, the second adhesive layer 108B, and the liner ply 110 outboard the perimeter portion 106 (FIG. 1A) may be removed and discarded to expose a portion of the first adhesive layer 108A. Alternately, the first adhesive layer 108A may have previously been exposed (e.g., by constructing the label 100 without the lower perimeter portion 100P'). The label 100 may thus be securable to the substrate 50 by nature of the exposed first adhesive layer 108A, such that the top side 102U of the first ply 102 is visible and the second ply 103 is shielded from view, as shown in FIG. 4B.

FIG. 4B shows the label 100 (e.g., the first adhesive layer 108A thereof) being brought into contact with the substrate 50 for adhesion therebetween. This is how the label 100 may initially be secured to the substrate 50. As will be appreciated, the label 100 is currently secured to the substrate via the adhesive layer 108A that is outboard the line of weakness 106; the lower surface of the second central portion 107B in contact with the substrate 50 does not include any adhesive but is secured against the substrate 50 by virtue of the exposed portion of the first adhesive layer 108.

Figure 4C:
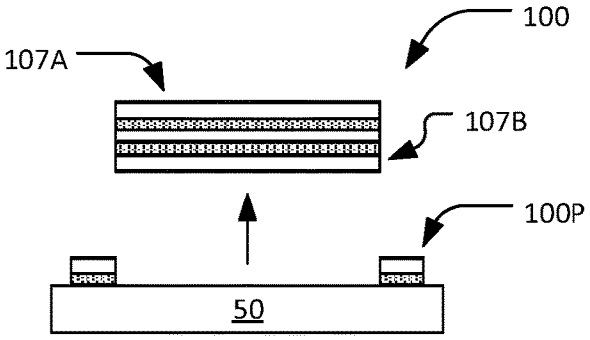
Figure 4D:
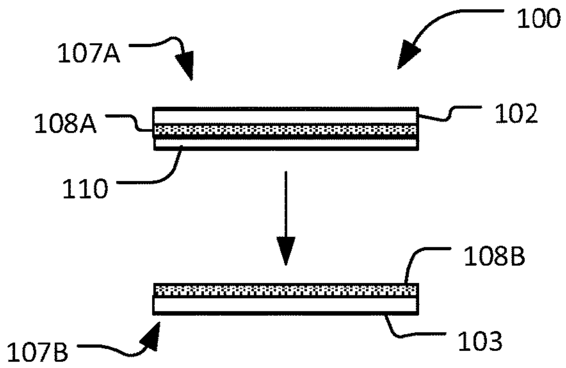
Figure 4E:
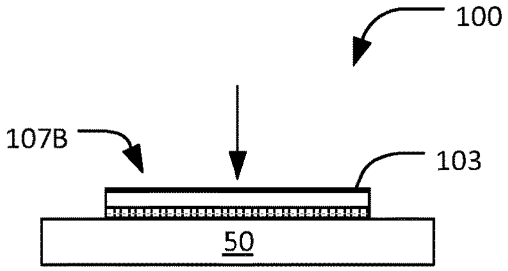

When desired, the user may tear the tear away portion 101 and use the lines of weakness 106 to remove the central portions 107A, 107B from the remainder of the label 100 (i.e., from the upper perimeter portion 100P, which may remain adhered to the substrate 50) (FIG. 4C). In this way, the user may access the indicia on the second ply 103. As can be seen in FIG. 4D, by virtue of the releasable properties of the intermediate liner ply 110, the second central portion 107B (i.e., the second face ply 103 and the second adhesive layer 108B with it) may be separated from the first face ply 102. In embodiments, the first central portion 107A may alternately or additionally be removed from the intermediate liner ply 110 (e.g., in cases where the liner ply 110 has releasable properties on both sides or only on the liner ply upper side 110U; in other embodiments, however, the liner 110 has releasable properties only on the side in contact with the adhesive layer 108B). Finally, as shown in FIG. 4E, the separated second central portion 107B may be adhered (e.g., via the second adhesive layer 108B) to the same or another substrate 50. There, the indicia on the second face ply 103 that was previously hidden may now be displayed upon the substrate 50.

In embodiments where the first face ply 102 is temporarily adhered to the liner ply 110 (i.e., where the liner ply 110 has a releasable substance such as silicone on both sides), the first face ply 102 may alternately or additionally be re-adhered to the same or another substrate 50 via the first adhesive layer 108A. In embodiments, a portion of the first face ply 102 may be configured to be disassociated from the remainder of the first face ply 102 (e.g., the first face ply 102 may have an area for providing the sender's and recipient's address, and a separate area that includes a gift card, a loyalty card, a fillable shipping label, et cetera).

Figure 5:
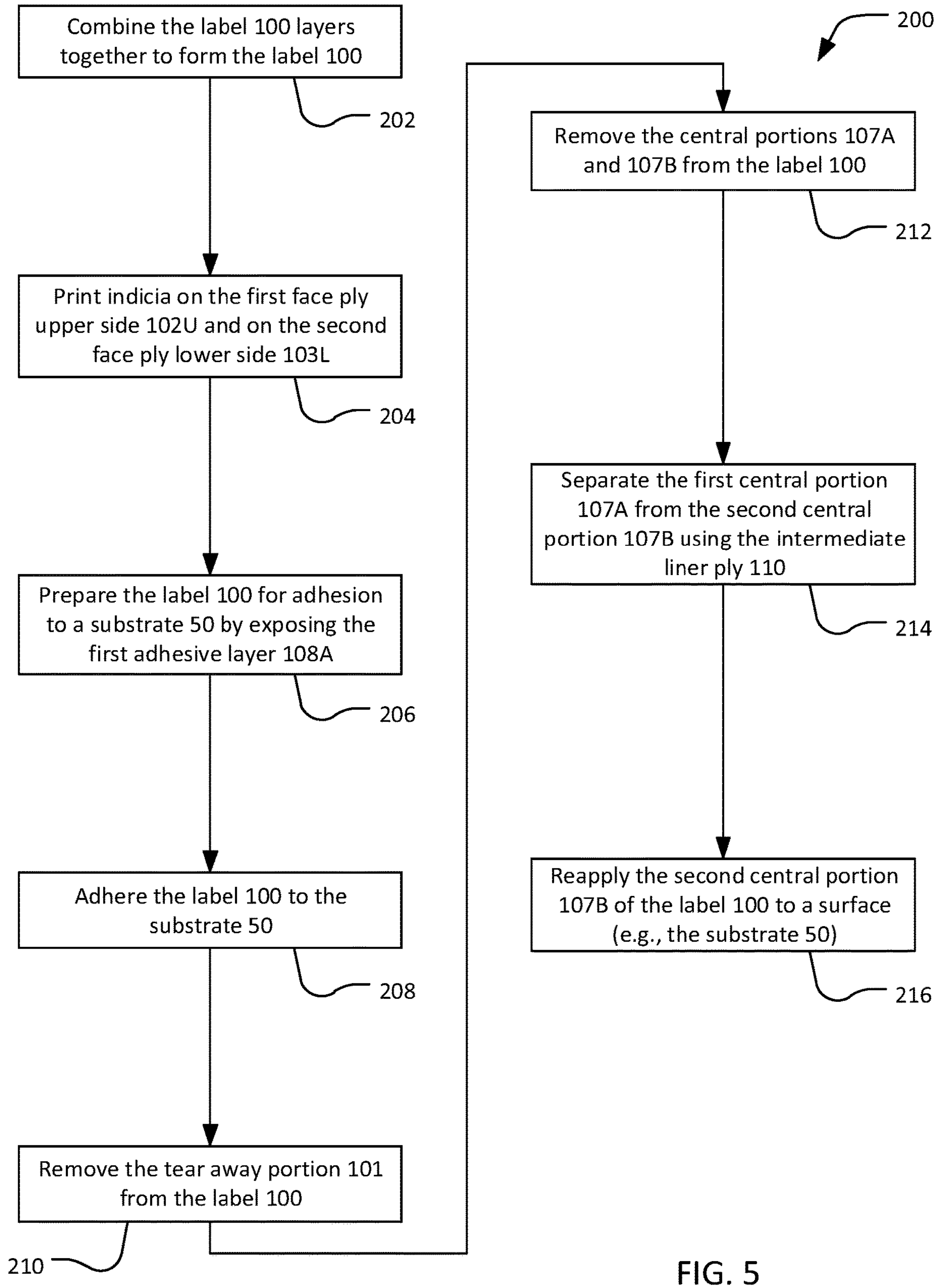
FIG. 5 is a flow chart illustrating a method of using the duplex label employing the intermediate liner of FIG. 1.

FIG. 5 is a flow chart illustrating a method 200 of making and using the label 100, in an embodiment. The FIGS. 4A-4E previously described may provide illustrate performance of the method 200, in embodiments. At step 202, the label 100 is constructed by combining the first face ply 102, the first adhesive layer 108A, the intermediate liner ply 110, the second adhesive layer 108B, and the second face ply 103 together, as described previously. Any desired coatings (e.g., printable coating 104, 105, releasable coatings 112, etc.) may be applied as well. The other features described above may be included in the label 100, such as the lines of weakness 106, the tear away portion 101, the gap 109, et cetera, before the layers are coupled to each other or thereafter.

At step 204, the first face stock 102 (e.g., the upper side 102U thereof) and the second face stock 103 (e.g., the lower side 103L thereof) may be provided with printed matter. This step may be accomplished using any suitable printing technique to print indicia (e.g., text, images, colors, private indicia, general or public indicia, etc.), such as inkjet printing, laser printing, direct thermal printing, thermal transfer, et cetera. The indicia may be printed simultaneously (e.g., both sides of the label 100 may receive indicia with a single pass through a printer) or the label 100 may use multiple passes through a printer to print the indicia on both of the face plies 102, 103.

Then, at step 206 (and shown in FIG. 4A), the first adhesive layer 108A is readied for application of the label 100 to the substrate 50. For instance, the user may remove the lower perimeter portion 100P' of the second face ply 103 to expose part of the first adhesive layer 108A. In other embodiments, the first adhesive layer 108A may be pre-exposed, such as when the label 100 is constructed without the lower perimeter portion 100P'. Then, at step 208 (and shown in FIG. 4B), the exposed portion of the first adhesive layer 108A may be used to adhere the label 100 to the substrate 50. In this way, the indicia printed on the first face ply 102 may be available for viewing, while the indicia printed on the second face ply 103 may be hidden by virtue of being sandwiched between the label 100 and the substrate 50.

The receiver of the substrate 50 (or another user) may then, at step 210, remove the tear away portion 101 from the label 100. The tear away portion 101 may be removed by exploiting the gap 109 and the lines of weakness 106. Then, at step 212 (as seen in FIG. 4C), the central portions 107A, 107B of the label 100 may be removed from the rest of the label 100 along the lines of weakness 106. The upper perimeter portion 100P of the label 100 may be left adhered to the substrate 50 as a result.

Next, at step 214 (and seen in FIG. 4D), the user may separate the first face ply 102 from the second face ply 103 using the intermediate liner ply 110. In other words, the first central portion 107A may be separated from the second face ply 107B using the intermediate ply 110. Because the intermediate liner ply 110 has releasable properties (e.g., by inherently having releasable properties and/or by having one or more releasable coatings 112), the intermediate liner ply 110 may indirectly and temporarily join the first face ply 102 and the second face ply 103 together. In embodiments, only the second face ply 103 is removable from the intermediate liner ply 110 (i.e., where the liner ply 110 has releasable properties only on the lower side 110L adjacent the second face ply 103), though in other embodiments, the first face ply 102 is alternately or additionally releasable from the intermediate liner ply 110. Then, at step 216 (and seen in FIG. 4E), the user may adhere the second central portion 107B to the same or another substrate 50. For instance, the second adhesive layer 108B associated with the second face ply 103 may be exposed by removing the liner ply 110 and brought into contact with the substrate 50. As a result of this, the indicia on the second face ply 103 may be available for viewing.

The steps of the method 200 may be modified, added to, and/or omitted as desired. For example, the step of separating and applying a plurality of central portions 107A, 107B may be added in embodiments where the label 100 includes multiple central portions 107A, 107B. As another example, the steps of separating the first central portion 107A from the liner ply 110 and reapplying the first central portion 107A via the first adhesive layer 108A to the same or another substrate 50 may be included where the first face ply 102 is releasably secured to the liner ply 110.

In use, the label 100 may provide for a label that may be printed on both a front and a back side. When applied to the substrate 50, the indicia printed on the second face ply 103 may be obscured. The user may use the gap 109 and the tear away portion 101 to remove the central portions 107A, 107B of the label 100, leaving behind the upper perimeter portion 100P' of the label 100. Once removed, the indicia that was previously obscured may now be viewed by the user. In embodiments, the bottom 100B of the second central portion 107B may have no appreciable adhesion, and the label 100 is secured to the substrate 50 only by way of that part of the first adhesive layer 108A that is exposed once the lower perimeter portion 100P' is removed. In this way, the central portions 107A, 107B themselves may not be fixedly secured to the substrate 50 upon initial application of the label 100 to the substrate 50. Thus, the central portions 107A, 107B may be readily removed from the label 100 and the substrate 50 once the lines of weakness 106 are broken. The central portions 107A and/or 107B may be subsequently attached to the same or another surface.

Embodiments of the label 100 described herein may provide for a label that may be advantageously printed on both sides (e.g., simultaneously or in sequence). The label 100 embodiments described herein may also provide for a label that advantageously reduces the amount of liner waste associated with conventional labels. For instance, the label 100 described herein may utilize only a single liner layer for what equates to two labels (i.e., the first face ply 102 and the second face ply 103 may be provided with different indicia, and at least one of the face plies 102, 103 may be applied separately from the other). Relative to conventional labels, embodiments of the label 100 described herein may use half the amount of liner layers for the same amount of labels. This means that the label 100 may advantageously have a reduced cost (e.g., materials cost, construction cost) compared to conventional labels. Reducing the amount of liner layers may also reduce the environmental impact of liner waste. Further, by requiring only a single liner layer in embodiments, the label 100 may provide for a duplex label that is relatively thin. A relatively thin label may be advantageous because the thin label takes up less space when stored (e.g., on a label roll or in a label stack) when compared to a relatively thicker label. This may provide a reduced cost in storing and/or transporting the thinner label.

Figure 6:
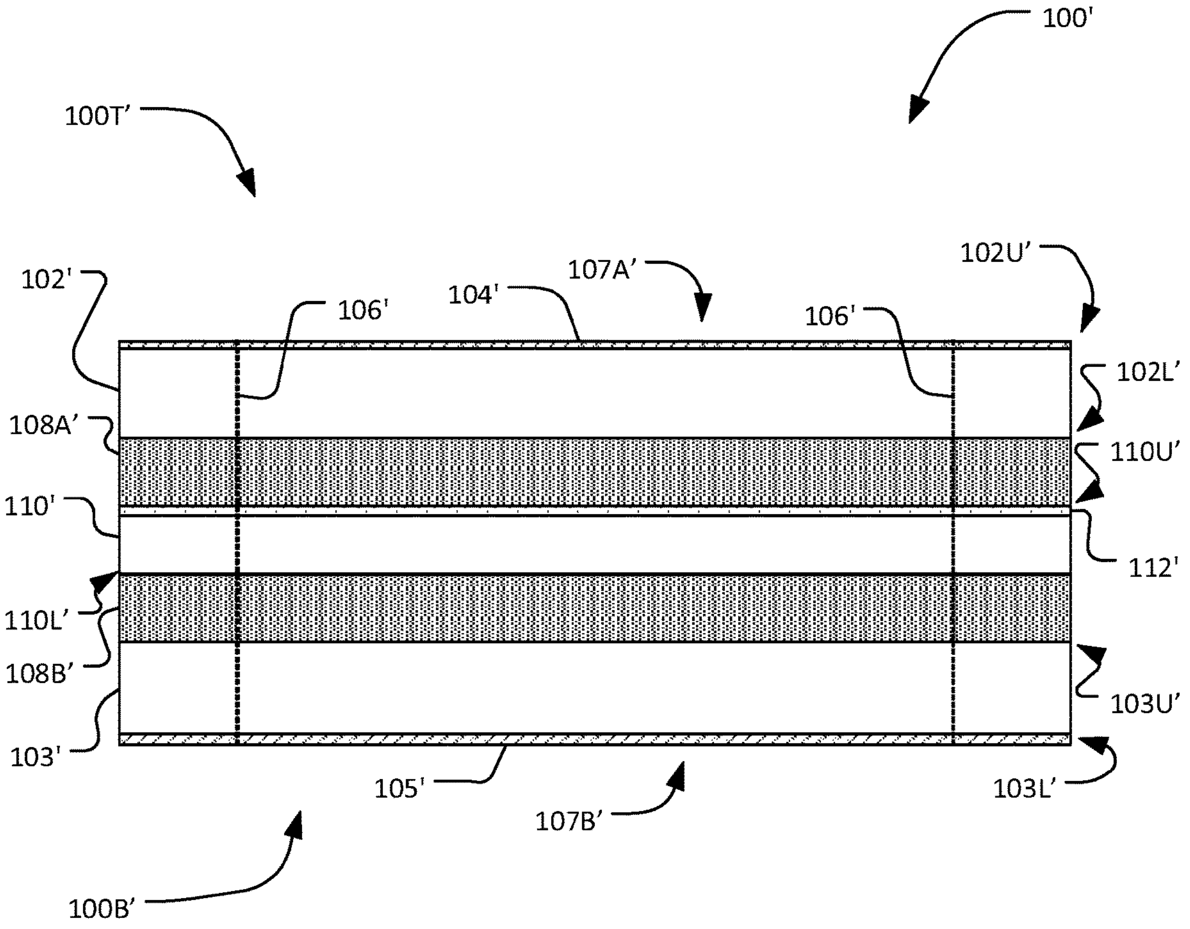
FIG. 6 is a schematic representation of a duplex label employing a single sided intermediate liner, according to an embodiment of the disclosure.

Focus is directed now to FIG. 6 which shows another embodiment 100' of the label 100. The label 100' may be identical to label 100, except as specifically noted and/or shown, or would be inherent. Corresponding reference numbers have been used to denote corresponding parts, though with any noted deviations. A primary difference between the label 100 and the label 100' may be that the label 100' may have a single sided intermediate liner 110', according to the teachings of the present disclosure. The illustrated label 100' has a top side 100T' and a bottom side 100B'. As discussed herein, indicia may be printed on the top side 100T' and/or the bottom side 100B', and the label 100' may be adhered to a substrate 50 (FIGS. 9A-9E) (e.g., a cardboard box, a piece of paper, an envelope, a porous surface, a non-porous surface, and/or any other suitable surface) at the bottom side 100B'. A portion of the label 100' may be removable from the rest of the label 100' sometime after the label 100' is adhered to the substrate 50. Due to the intermediate liner ply 110', the face plies of the label 100' may be separable from each other. Such a configuration may allow for the reapplication of one of the face plies to the same or another substrate 50. In this way, the indicia that was previously hidden (e.g., by nature of being sandwiched between the topmost face ply and the substrate 50) may be revealed to a user.

An example application of the label 100' may be a label containing shipping information indicia on a top side 100T' and return shipping information indicia on a back side 100B'. The label 100' may be adhered to a substrate 50 (e.g., a package to be shipped) with the shipping information indicia being visible. The receiver of the package may separate one or more portions (e.g., a first central portion 107A' and a second central portion 107B') of the label 100' from the rest of the label 100. The package receiver may then separate the one of the face plies from the intermediate liner ply 110' and apply the removed portion to the same or another substrate 50. In this way, the previously hidden return shipping indicia may now be displayed.

In more detail, and going from the label top side 100T' to the label back side 100B', the label 100' may have a first face stock 102', which may have an upper side 102U' and a lower side 102L'. The first face stock 102' may comprise a solitary ply 102', made, for example, of paper. This face stock 102' may also be referred to herein as a face ply to indicate that the face ply comprises a solitary ply. Alternately, in other embodiments, the face stock 102' may contain more than one ply. In other embodiments still, the face stock 102' may comprise a film (e.g., a clear plastic film) or other printable substrate. In essence, the first face ply 102' may be any suitable material that is desired.

The first face ply 102', at its upper side 102U', may be provided with a topcoat 104'. The topcoat 104' may be configured for the reception of printed (e.g., black and/or colored) indicia (e.g., content configured to be consumed by consumers). As such, the label 100' may be printed using any suitable technology now known or subsequently developed (such as a direct thermal printer, a thermal transfer printer, a laser printer, an inkjet printer, et cetera). In embodiments, the topcoat 104' may be foregone where the first face stock 102' is inherently printable. Alternately or additionally, the topcoat 104' may be located only where printing is desirable. For example, in embodiments, the topcoat 104' may be located only in the first central portion 107A' (e.g., an area defined by lines of weakness 106') of the label 100'.

A first adhesive layer 108A' may be located on the face ply lower side 102L'. The adhesive layer 108A' may comprise any suitable (e.g., compatible with the type of printing used) adhesive now known or subsequently developed, such as hot melt adhesive, pressure sensitive adhesive, remoistenable adhesive, et cetera. In embodiments, the first adhesive layer 108A' may adhesively couple the first face ply 102' to the intermediate liner layer 110'.

The intermediate liner layer 110' may be sandwiched between the first adhesive layer 108A' and a second adhesive layer 108B' (which itself may be substantially the same or similar to the first adhesive layer 108A'). The liner layer 110' may be a paper, film, or other ply that has releasable properties on only a single side. That is to say, one of the sides of the intermediate liner layer 110' may have properties which enable adhesive to be temporarily secured thereto, while the other side is devoid of such releasable properties. For example, the intermediate liner layer 110' may have one or more releasable coatings 112' having releasable properties located on the liner ply lower side 110L' and/or the liner ply upper side 110U'. In operation, the liner ply 110' may have releasable properties on the sides 110U' or 110L' where it is desired to temporarily secure the first face ply 102' or a second face ply 103', respectively, to the liner ply 110'. In embodiments, the liner layer 110' may have indicia printed (e.g., preprinted, printed prior to label 100' assembly, etc.) thereupon. This preprinted information on the liner layer 110' may be, for example, promotional (e.g., a coupon, an advertisement, etc.) or other indicia that may be available for viewing by a user after the first face ply 102' or the second face ply 103' is removed from the liner layer 110'. In a currently preferred embodiment, the liner layer 110' may have releasable properties only on the upper side 110U', and on the bottom side, the liner layer 110' may be adhesively and fixedly secured to the second face ply 103'. Such fixed securement of the second face ply 103' to the liner layer 110' may increase the structural integrity and durability of the second face ply 103', both for printing and for storage.

Like the first adhesive layer 108A', the second adhesive layer 108B' may be any suitable adhesive now known or subsequently developed. In embodiments, the second adhesive layer 108B' may be a different type of adhesive than the adhesive used in the first adhesive layer 108A'.

The second face ply 103' may be substantially the same or similar to the first face ply 102', except that the second face ply 103' may be secured to the label 100' along the label bottom side 100B'. Specifically, the second face ply 103' may be secured to the second adhesive layer 108B' at a second face ply upper side 103U' and may have a second printable coating 105' on the lower side 103L' thereof. Like the first printable coating 104', the second printable coating 105' may receive printed matter or indicia. In embodiments, the second printable coating 105' is a different kind of coating than the first printable coating 105'. In embodiments where the first face ply 102' is fixedly secure to the liner ply 110', the second face ply 103' may be temporarily secured to the intermediate liner ply 110' such that the second face ply 103' is removable by a user. While the second face ply 103' may not have adhesive on the lower side 103L' thereof, the second face ply 103' may contact and remain in contact with the substrate 50 upon adhesion of the label 100' to the substrate because of the configuration of the label 100'.

In embodiments, the size and/or shape of the second face ply 103', the second adhesive layer 108B', and the liner ply 110' may match that of the other label 100' layers (e.g., the first face ply 102'). In other embodiments, the size and/or shape of one or more label 100' layers may be different from another. For instance, the second liner ply 103', the second adhesive layer 108B', and the liner ply 110' may be sized such that a perimeter of each of these layers bounds a perimeter of the first layer of adhesive 108A' and he first face ply 102'.

The second face ply 103' may have a second central portion 107B' that generally corresponds (e.g., by having a similar shape, by having a similar size, etc.) with the first central portion 107A'. In embodiments, the first central portion 107A' may include portions of the first face ply 102' and the first adhesive layer 108A', and the second central portion 107B' may include portions of the intermediate liner ply 110', the second adhesive layer 108B', and the second face ply 103'. Like the first central portion 107A', the second central portion 107B' may be delineated by the lines of weakness 106' (e.g., the lines of weakness 106' may extend through the label 100' layers and define both the first central portion 107A' and the second central portion 107B'). In some embodiments, the central portions 107A', 107B' are defined by different sets of lines of weakness 106'. In these cases, the central portions 107A', 107B' may be of different sizes.

Figure 6A:
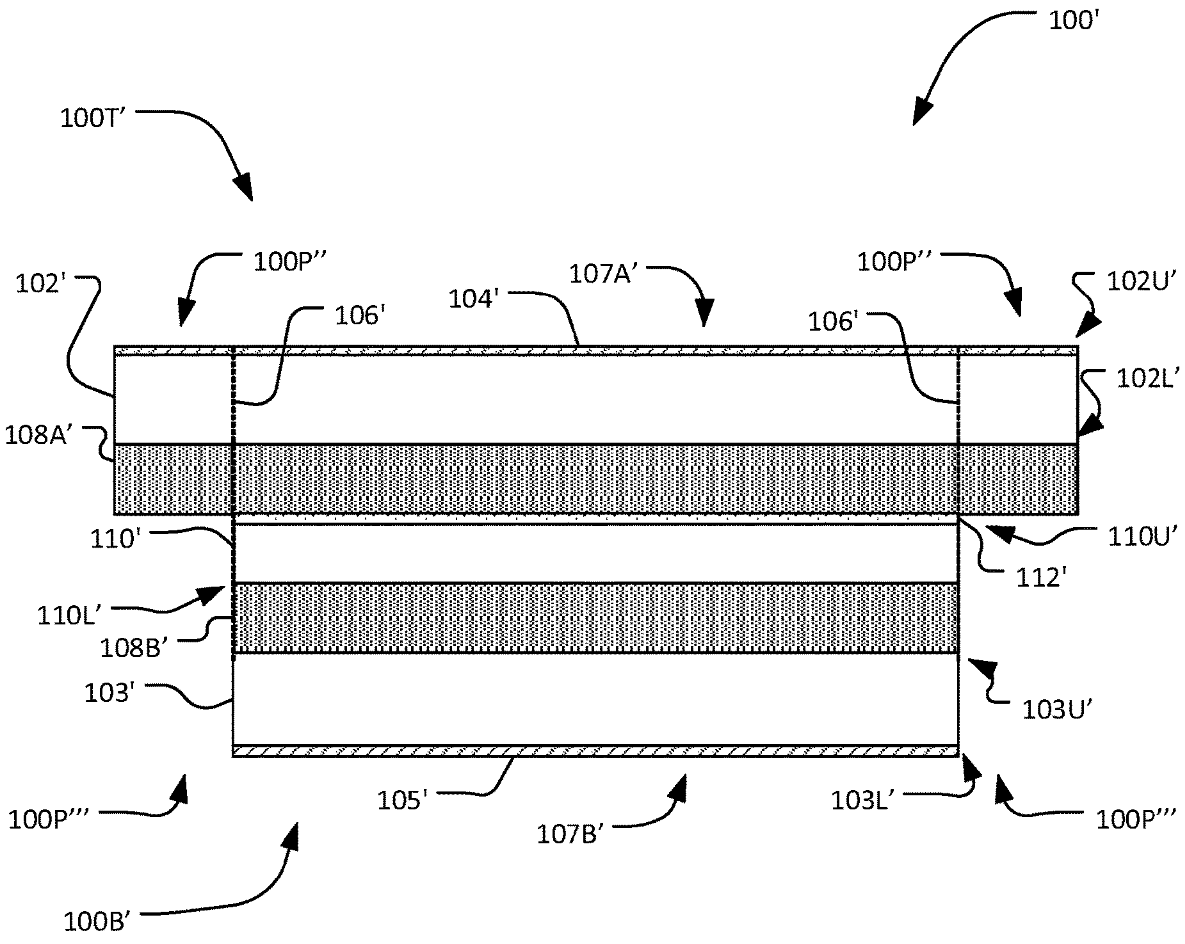
FIG. 6A is a schematic representation of the duplex label employing the single sided intermediate liner of FIG. 6, in a use configuration.

In FIG. 6A, a use configuration is shown where portions of the label 100' is removed and the label 100' has been prepared for securement to the substrate 50. FIG. 6A also highlights an upper perimeter portion 100P" and a lower perimeter portion 100P'" of the label 100' (in FIG. 6A, a void is shown in place of the perimeter portion 100P" "' that has been removed to prepare the label 100' for securement to the substrate 50). The upper perimeter portion 100P" may correspond to the first face ply 102' and the first adhesive layer 108A', and the lower perimeter portion 100P'" may correspond to the intermediate liner ply 110', the second adhesive layer 108B', and the second face ply 103'. In operation, the upper perimeter portion 100P" may be the portion of the label 100' layers that resides outboard or surrounds the first central portion 107A', and the lower perimeter portion 100P" "' may be the portion of the label 100' layers that resides outboard or surrounds the second central portion 107B'. Due to the lines of weakness 106', the perimeter portions 100P" and 100P'" may be separable from their respective central portions 107A' and 107B'. For example, the lines of weakness 106' may be exploited to remove the lower perimeter portion 100P'" from the second central portion 107B', thus exposing the first adhesive layer 108A', as is shown in FIG. 6A. In this manner, the label 100' may be made ready for adherence to the substrate 50.

The lines of weakness 106' may be perforations, die cuts, folds, or any other suitable feature that enables separation of the central portions 107A', 107B' from the perimeter portion 100P", 100P'". The lines of weakness 106' may extend through some or all of the layers of the label 100' (e.g., the face plies 102', 103', the adhesive layers 108A', 108B', the intermediate liner layer 110', et cetera), and may define the central portions 107A', 107B'. Put another way, in embodiments, the central portions 107A', 107B' may reside entirely within the lines of weakness 106'. In operation, the lines of weakness 106' may be broken to allow a user to separate the central portions 107A', 107B' from the rest of the label 100'. In cases where the label 100' is adhered to the substrate 50 and the central portions 107A', 107B' are thereafter separated from the label 100' along the lines of weakness 106', the rest of the label 100' (i.e., the perimeter portion 100P") (see FIG. 9C) may be left behind on the substrate 50. In some embodiments, there may be at least four lines of weakness 106' that define the central portions 107A', 107B' (see FIG. 7), though this need not be the case. Alternate arrangements of lines of weakness 106' are contemplated herein, such as two lines of weakness 106' that extend the entire length of the label 100'. In such an embodiment, the perimeter portions 100P", 100P'" of the label 100' may consist of two strips on opposing sides of the central portions 107A', 107B'. In other embodiments, the lines of weakness 106' define two or more central portions 107A' and/or 107B' within the label 100'. In such cases, the lines of weakness 106' may allow for further separation of the central portions 107A' and/or 107B' from each other. For example, the first face ply 102' may have an additional line of weakness 106' spanning its width, thus allowing for the separation of the first central region 107A' into smaller portions. These separate, smaller portions may themselves each be adherable to the same or another substrate 50. In other embodiments still, the label 100' may have any suitable number, size, shape, and/or arrangement of central portions 107A', 107B' and lines of weakness 106'.

Generally, indicia printed on the first face ply 102' may be public indicia (e.g., shipping information, warning labels, return labels, etc.) and indicia printed on the second face ply 103' may be private indicia (e.g., packing lists, return labels, promotional offers, et cetera). In operation, the indicia on the first face ply 102' may be viewed by anyone who views the package to which the label 100' is adhered (i.e., after the lower perimeter portion 100P'" is removed and the first adhesive layer 108A' had been exposed). The recipient of the package may use the lines of weakness 106' to remove both the central portions 107A', 107B' from the upper perimeter portion 100P" of the label 100', and may then view the indicia printed on the second face ply 103'

In embodiments, because the second face ply 103' may have no adhesive on the lower side 103L' thereof, the label 100' may be secured to the substrate 50 only by way of the first adhesive layer 108A' that is exposed along the upper perimeter portion 100P". In this way, the central portions 107A', 107B' themselves may not be fixedly secured to the substrate 50 when the label 100' is initially secured to the substrate 50. The central portions 107A', 107B' may thereafter be readily removed from the both the rest of the label 100' and the substrate 50 along the lines of weakness 106'. The first face ply 102' may subsequently be removed from the intermediate liner ply 110' and the first face ply 102' may be adhered to the same or another substrate 50. In this way, the previously hidden indicia on the second face ply 103' may be exposed for viewing and/or the first face ply 102' may be reused. For instance, the second face ply 103' may have a packing list printed thereupon, and the first face ply 102' may have a return label printed thereupon which may be reapplied to a package after being separated from the second face ply 103'.

Figure 7:
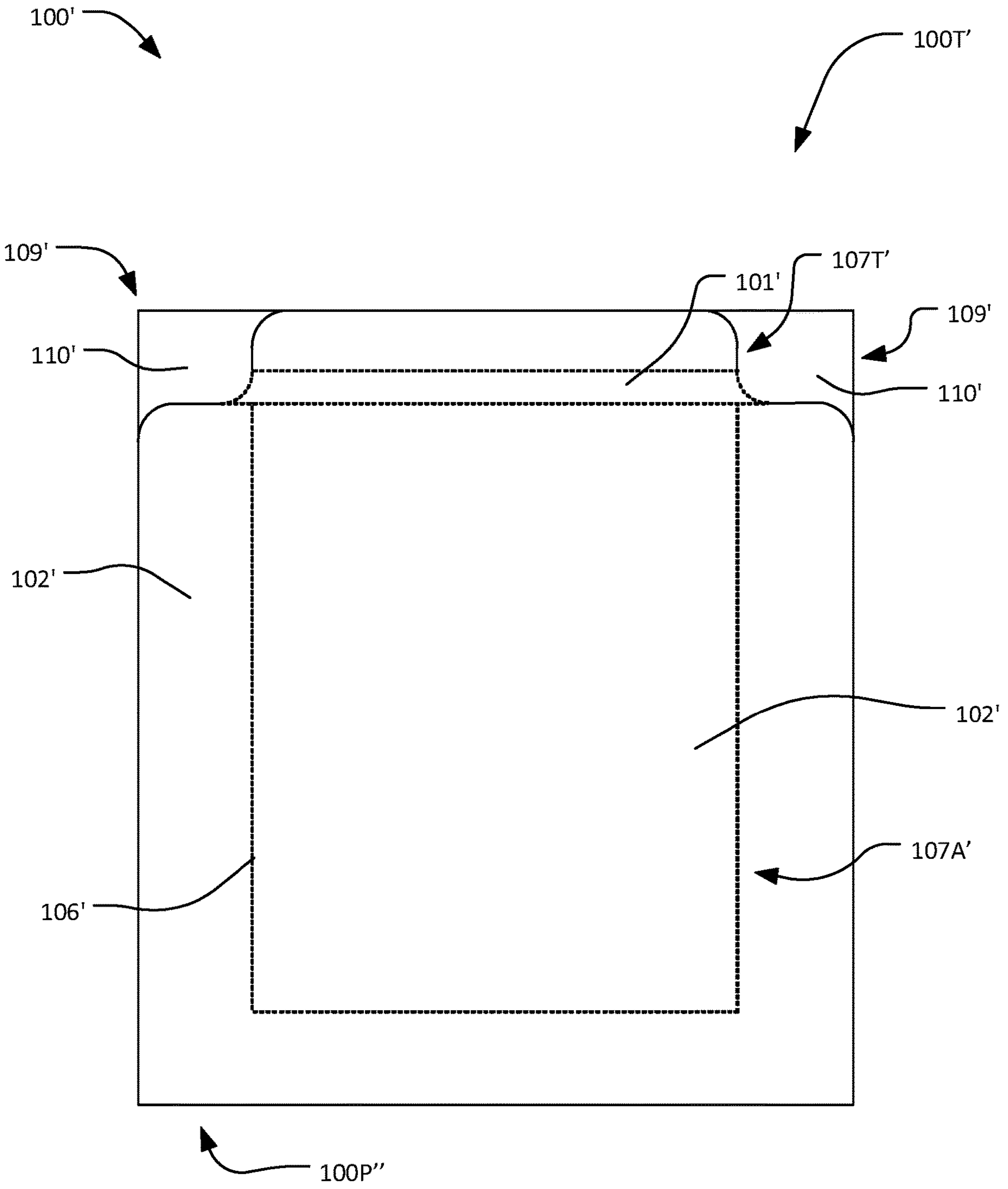
FIG. 7 is a top view of the duplex label employing the single sided intermediate liner of FIG. 6.

Moving now to FIG. 7, the top side 100T' of the label 100' is shown. The first central portion 107A' may be delineated by the lines of weakness 106' in the first face ply 102' and the first adhesive layer 108A'. In embodiments, at least some of the lines of weakness 106' extend through each of the first face ply 102', the adhesives layers 108A' and 108B', the liner ply 110', and the second face ply 103'. The lines of weakness 106' may also delineate a tear away portion 101' located at a top area 107T' of the first face ply 102' and/or the second face ply 103' (i.e., the lines of weakness 106' may form a tear away portion 101' in each of the face plies 102' and 103', the adhesive layers 108A' and 108B', and the liner layer 110'). In some embodiments, the tear away portion 101' may be coextensive with the central portions 107A', 107B' (i.e., a width or height of the tear way portion 101' may be the same as a width or height of the central portions 107A', 107B'). The tear away portion 101' may be configured to be removed from the label 100' to facilitate the removal of the central portions 107A', 107B' from the upper perimeter portion 100P", for instance, after the label 100' is secured to the substrate 50. That is to say, removing the tear away portion 101' may allow a user to slip a finger or other tool underneath the central portions 107A', 107B' and remove them from the rest of the label 100' via the lines of weakness 106'. Without the tear away portion 101', a user may have more difficulty acquiring the necessary amount of space and/or leverage required to remove the central portions 107A', 107B' from the perimeter portion 100P". In embodiments, there may be one or more tear away portions 101', and these one or more tear away portions 101' may be located adjacent the central portions 107A', 107B', such as a left, right, or bottom side of the central portions 107A', 107B'.

Some embodiments, such as the one shown in FIG. 7, may have one or more shoulders 109' that corresponds to the tear away portion 101'. The shoulders 109' may be one or more portions that are devoid of one or more layers (e.g., all layers, all layers but the layers comprising the lower perimeter portion 100P'", etc.) of the label 100' that leaves at least a portion of a side of the tear away portion 101' exposed. In operation, the combined tear away portion 101' and shoulders 109' may provide space for the user to remove the central portions 107A', 107B' from the label 100' after the label 100' is adhered to the substrate 50. The shoulders 109' may be on any suitable side (e.g., top, left, right, bottom) of the tear away portion 101' that facilitates access to the tear away portion 101' by the user. The shoulders 109' may also be any suitable shape or size to facilitate user access to the tear away portion 101'. For example, in some embodiments, the shoulders 109' may have a width greater than a width of the tear away portion 101'. In other embodiments, the shoulders 109' may have a width equal to or greater than the top portion 107T' of the face plies 102' and 103'. In embodiments, the tear strip 107T' may be inset or its edges may be coplanar with the line of weakness 106', and the shoulder 109' (which may be devoid of the first face ply 102', the liner ply 110', the second face ply 103') may facilitate the tearing of the tear away portion 101' and allow for easier access to the perimeter portion.

Figure 7A:
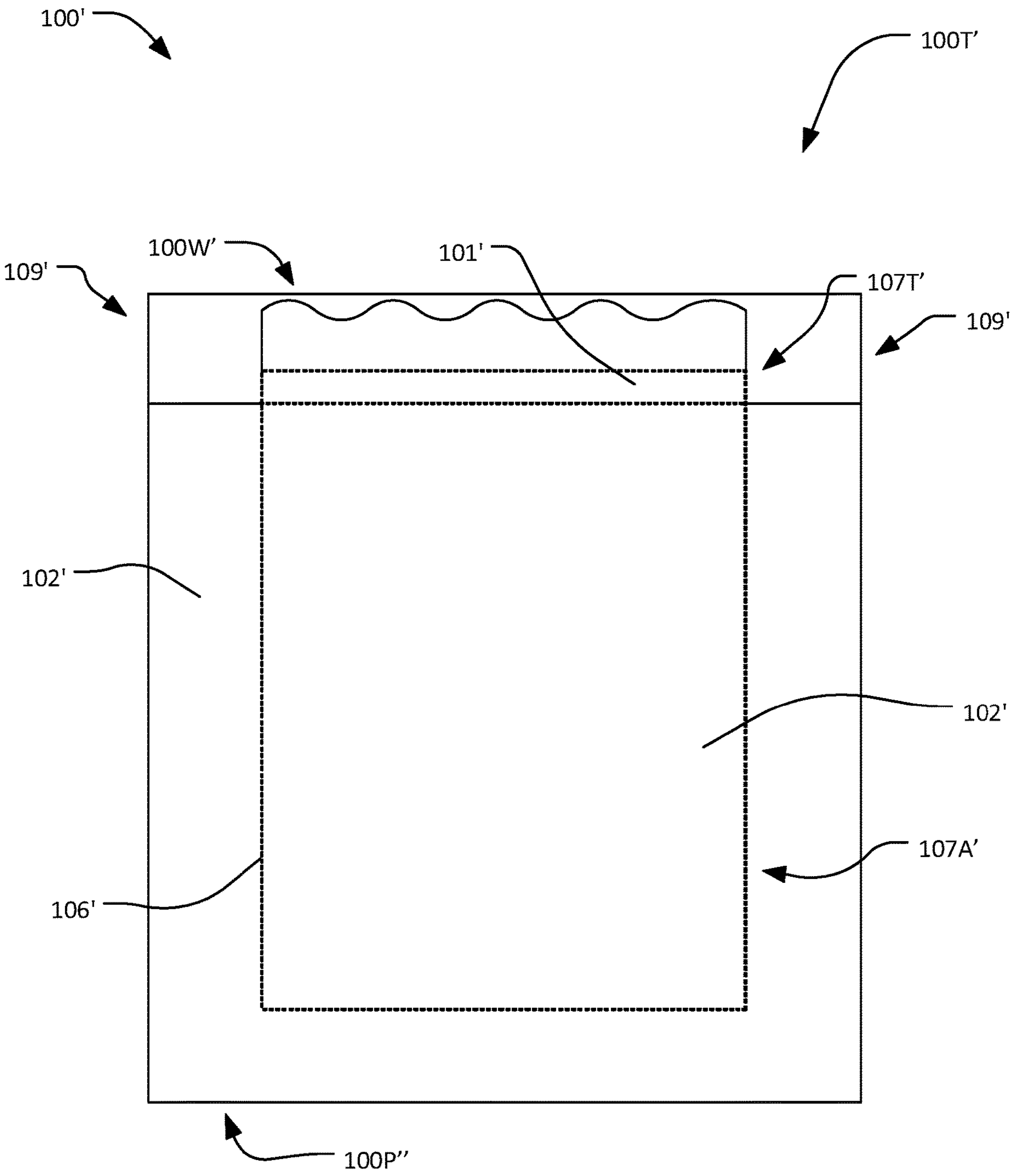
FIG. 7A is a top view of the duplex label employing the single sided intermediate liner of FIG. 6, according to another embodiment.

FIG. 7A shows another embodiment of the label 100', with a modified top area 107T'. Sometimes edges, and most commonly a top or forward edge, of conventional labels may get caught and/or torn when passing through machinery (e.g., a printer, an application machine, et cetera). Instead of having a relatively straight edge for a perimeter edge of the label 100', the top area 107T' may have a shaped edge 100W'. The shaped edge 100W' may be any suitable non-straight shape, such as a wavy shape, a zig-zag shape, et cetera. In operation, the edge 100W' may provide less label 100' surface area around the top area 107T' relative to a straight perimeter edge. Because there may be less area of the label 100' available for catching on machinery, the label 100' with the shaped edge 100W' may be less prone to jamming or tearing on equipment when compared to conventional labels.

Figure 8:
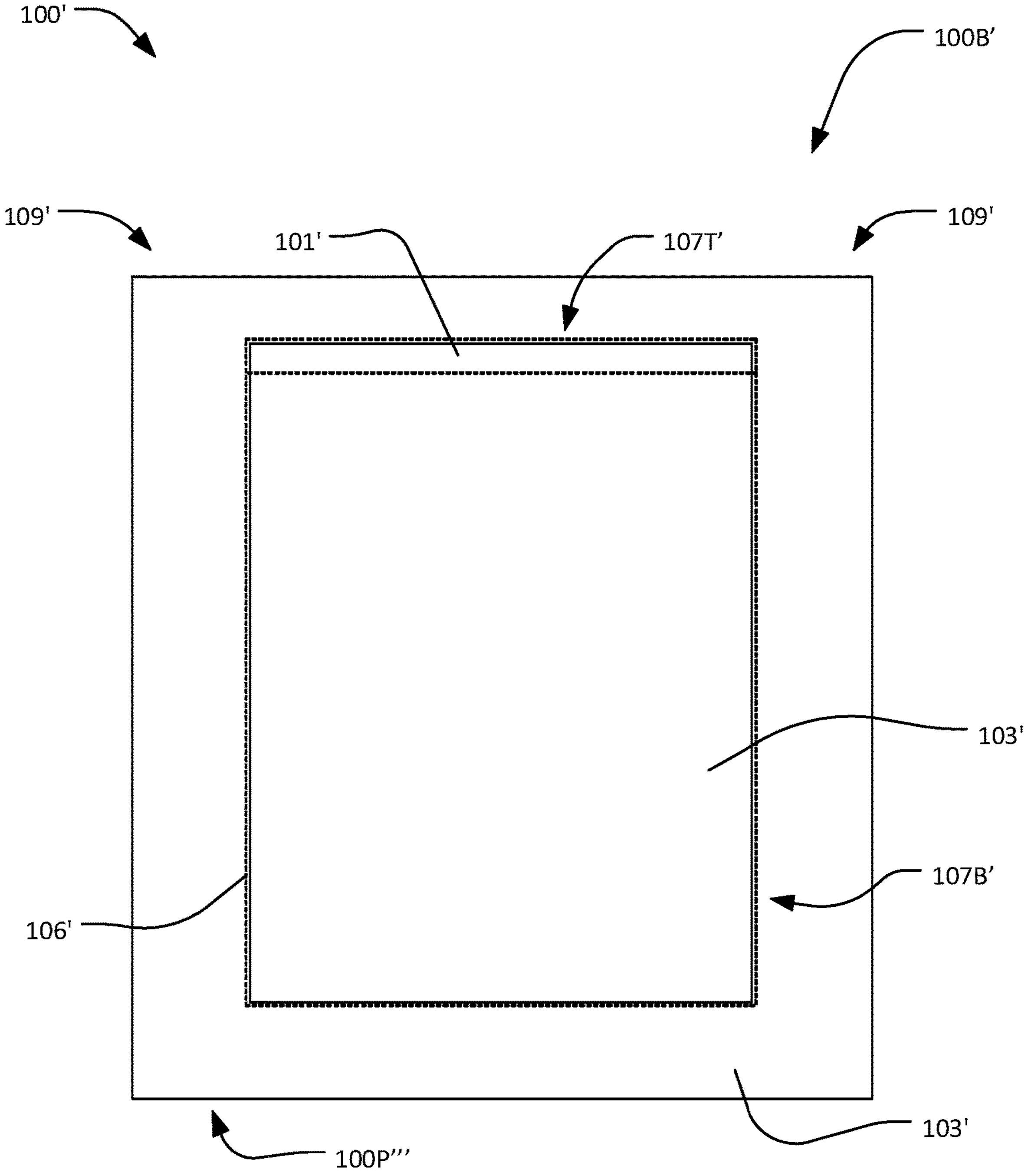
FIG. 8 is a bottom view of the duplex label employing the single sided intermediate liner of FIG. 6.

FIG. 8 shows a bottom side of the label 100' before the lower perimeter portion 100P''' is removed. Here, the lines of weakness 106' are seen bounding the second central portion 107B', and the tear away portion 101' resides at a top part 107T' of the second central portion 107B'. In embodiments, the lines of weakness 106' may be what facilitates the separation of the lower perimeter portion 100P''' of to expose the first adhesive layer 108A', as opposed to a separate die cut or other operation (i.e., where the label 100' is constructed with the lower perimeter portion 100P''' already removed or not present).

Figure 8A:
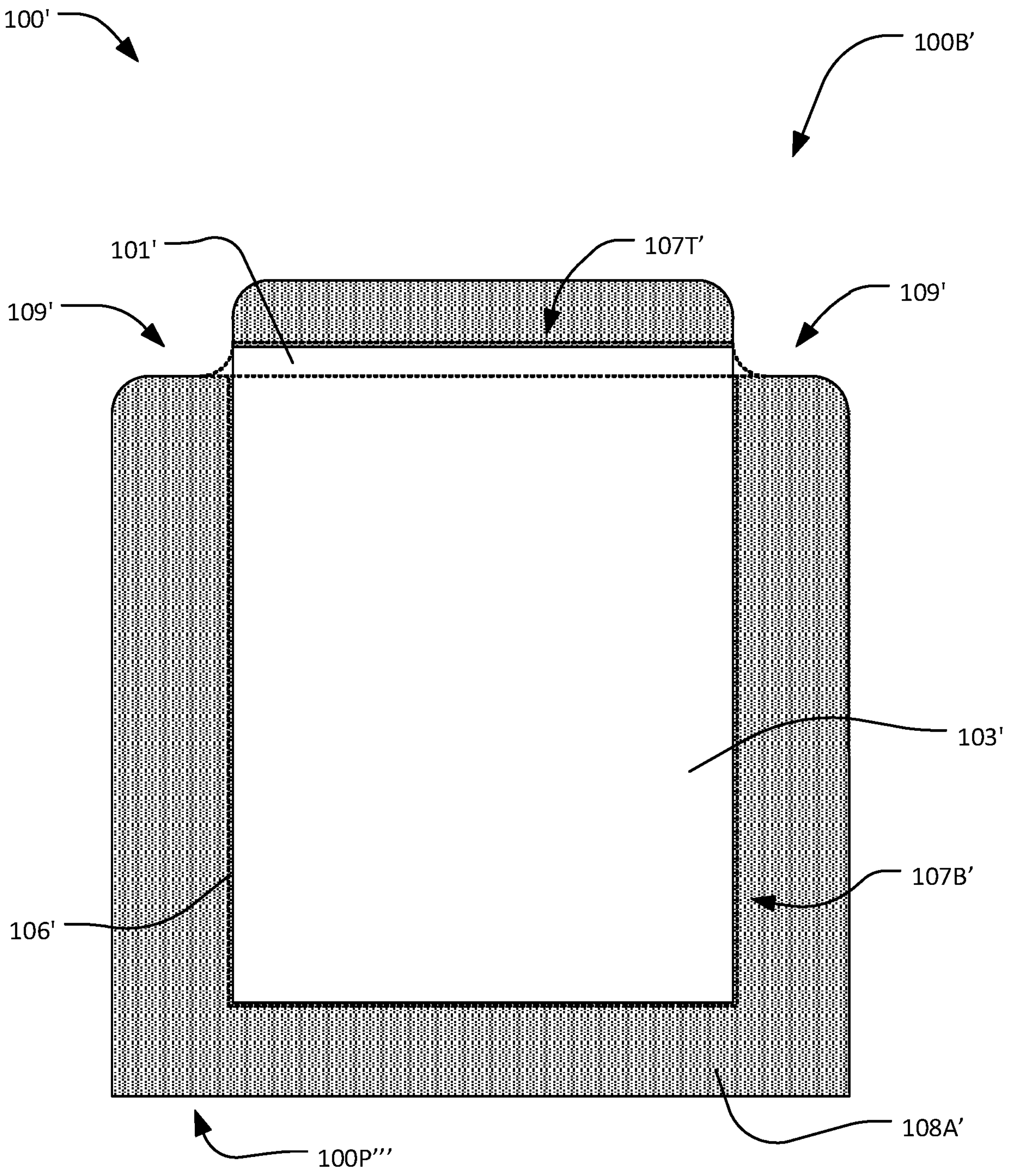
FIG. 8A is a bottom view of the duplex label employing the single sided intermediate liner of FIG. 6, in the use configuration.

FIG. 8A shows a bottom side 100B' view of the label 100' in the use configuration, i.e., after the lower perimeter portion 100P''' has been removed. Here, the perimeter portion 100P' of the first adhesive layer 108A' is exposed (e.g., by virtue of the lower perimeter portion 100P''', consisting of portions of the second face ply 103', the liner layer 110', and the second adhesive layer 108B' being removed). The lines of weakness 106' in the first adhesive layer 108A' are seen bounding the second face ply 103', and the tear away portion 101' resides at the top part 107T' of the central portion 107B'. The shoulders 109' are depicted as voids here since the shoulders 109' may be categorized as initially containing no upper perimeter 100P'' layers (e.g., the first face play 102' and the first adhesive layer 108A'). Since the label 100' shown in FIG. 8A has had the lower perimeter portion 100P''' (e.g., the liner layer 110', the second adhesive layer 108B', and the second face ply 103') already removed, this may leave the label 100' devoid of any layers at the shoulders 109'

In embodiments, one or more (e.g., all) of the corners of the label 100' layers and/or the central portions 107A', 107B' may be rounded or filleted. For example, some or all of the corners of the label 100' that are in the vicinity of the shoulders 109' and/or the tear away portion 101' may be rounded to facilitate user access thereto.

Figure 9A:
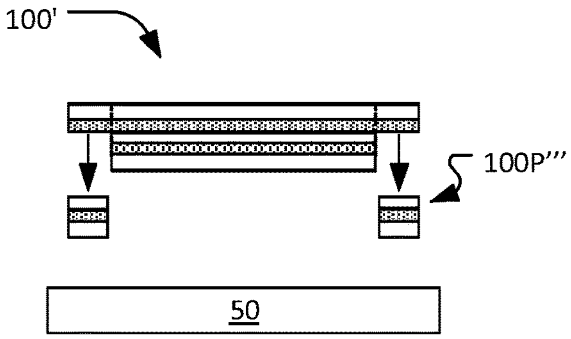
FIGS. 9A-9E are schematic representations of an example operation of the duplex label employing the single sided intermediate liner of FIG. 6.
Figure 9B:
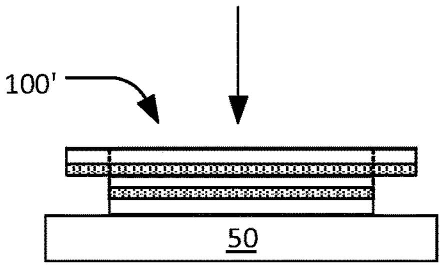

Attention is now directed FIGS. 9A-9E, where example operation of the duplex label 100' with intermediate liner 110' is illustrated. Sets of indicia may be printed on one or both of the face plies 102', 103' prior to adherence of the label 100' to a substrate 50. These sets of indicia may be printed simultaneously (i.e., with a single pass of the label 100' through a printer) or subsequently (i.e., with multiple passes through a printer). As shown in FIG. 9A, a user may prepare the label 100' for securement to the substrate 50 by removing the lower perimeter portion 100P'' ". Specifically, portions of the second face ply 103', the second adhesive layer 108B', and the liner ply 110' outboard the perimeter portion 106' (FIG. 6A) may be removed and discarded to expose a portion of the first adhesive layer 108A'. Alternately, the first adhesive layer 108A' may have previously been exposed (e.g., by constructing the label 100' without the lower perimeter portion 100P'"'). The label 100' may thus be securable to the substrate 50 by nature of the exposed first adhesive layer 108A', such that the top side 102U' of the first ply 102' is visible and the second ply 103' is shielded from view, as shown in FIG. 9B. FIG. 9B shows the label 100' (e.g., the first adhesive layer 108A' thereof) being brought into contact with the substrate 50 for adhesion therebetween. This is how the label 100' may initially be secured to the substrate 50.

Figure 9C:
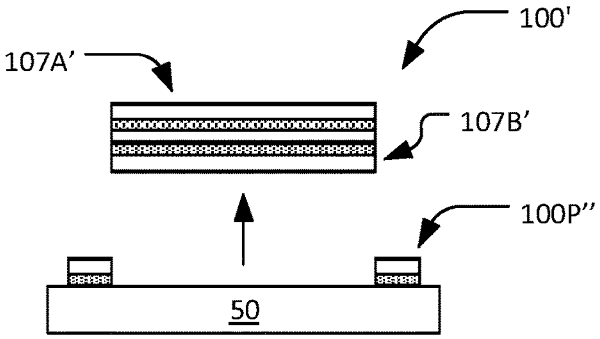
Figure 9D:
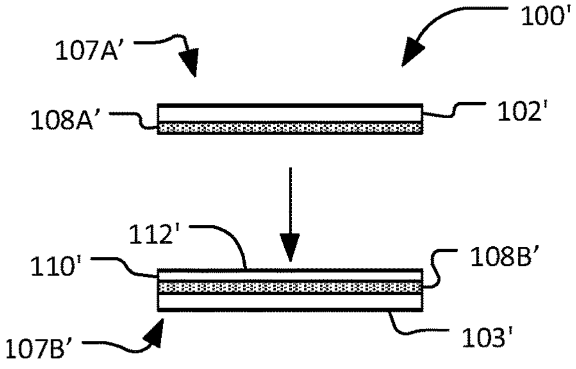
Figure 9E:
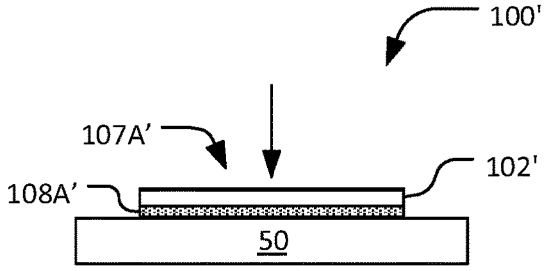

When desired, the user may tear the tear away portion 101' and use the lines of weakness 106' to remove the central portions 107A', 107B' from the remainder of the label 100' (i.e., from the upper perimeter portion 100P'', which may remain adhered to the substrate 50) (FIG. 9C). In this way, the user may access the indicia on the second ply 103'. As can be seen in FIG. 9D, by virtue of the releasable properties of the intermediate liner ply 110', the first central portion 107A' (i.e., the first face ply 102' and the first adhesive layer 108A' with it) may be separated from the second central portion 107B' (i.e., the second face ply 102', the intermediate liner 110', and the adhesive 108B' therebetween). In embodiments, the second central portion 107B' may alternately be removed from the intermediate liner ply 110' (e.g., in cases where the liner ply 110' has releasable properties on only the liner ply lower side 110L'). Finally, as shown in FIG. 9E, the separated first central portion 107A' may be adhered (e.g., via the first adhesive layer 108A') to the same or another substrate 50. There, the indicia on the first face ply 102' may now be displayed upon the substrate 50. In embodiments where the second face ply 103' is instead temporarily adhered to the liner ply 110', the second face ply 103' may alternately be re-adhered to the same or another substrate 50 via the second adhesive layer 108B'.

Figure 10:
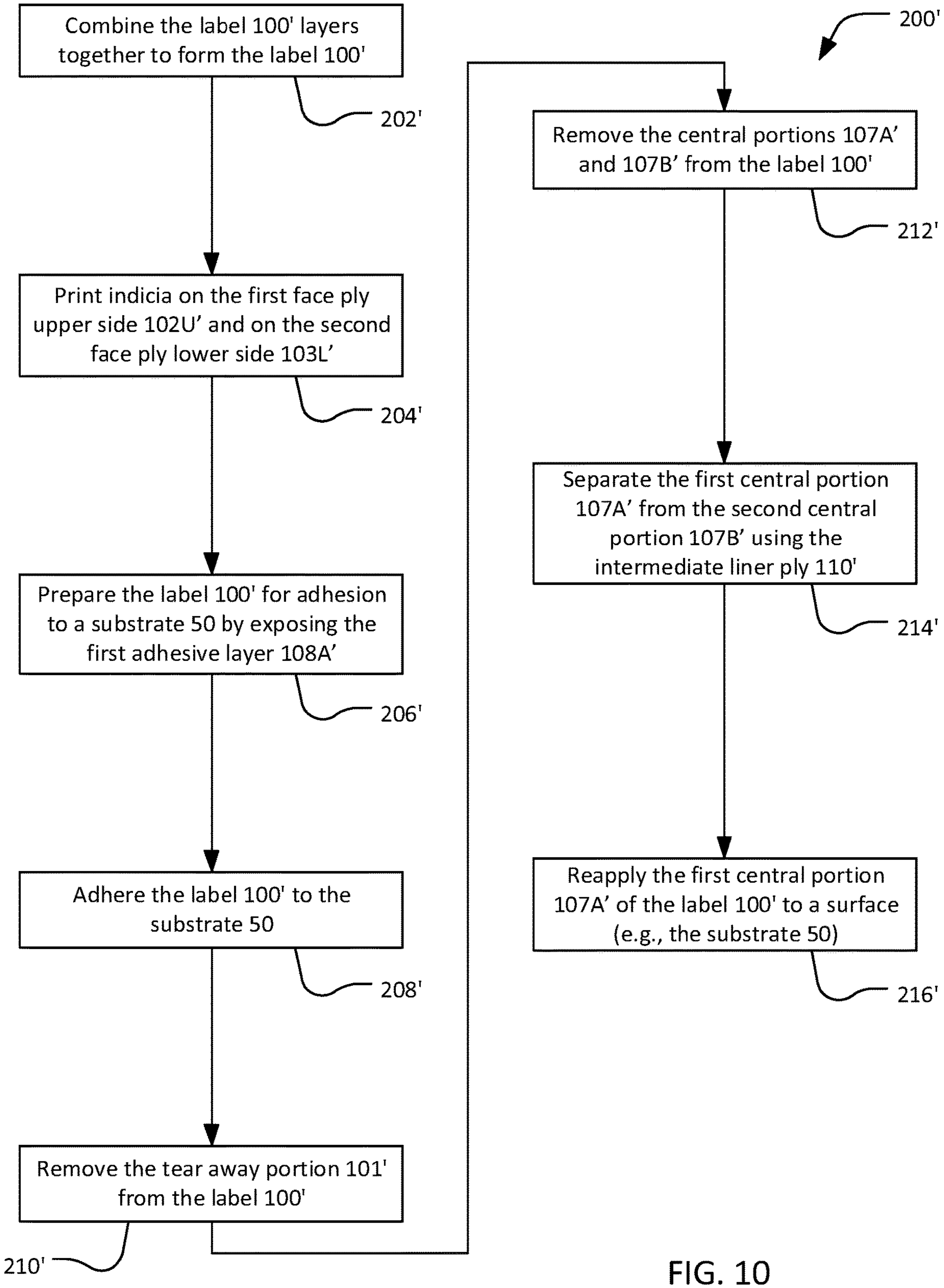
FIG. 10 is a flow chart illustrating a method of using the duplex label employing the single sided intermediate liner of FIG. 6.

FIG. 10 is a flow chart illustrating a method 200' of making and using the label 100', in an embodiment. The FIGS. 9A-9E previously described may illustrate at least some of the performance of the method 200', in embodiments. At step 202', the label 100' is constructed by combining the first face ply 102', the first adhesive layer 108A', the intermediate liner ply 110', the second adhesive layer 108B', and the second face ply 103' together, as described previously. Any desired coatings (e.g., printable coating 104', 105', releasable coatings 112', etc.) may be applied as well. The releasable coating 112' may be present on only a single side of the liner ply 110', such that only one of the first face ply 102' and the second face ply 103' is releasably adhered to the liner ply 110' and the remaining ply is fixedly secured to the liner ply 110'. During this time is where other features may be included in the label 100', such as the lines of weakness 106', the tear away portion 101', the shoulders 109', et cetera. Thereafter, at step 204', the first face stock 102' (e.g., the upper side 102U' thereof) and the second face stock 103' (e.g., the lower side 103L' thereof) may be provided with printed matter. This step may be accomplished using any suitable printing technique to print indicia (e.g., text, images, colors, private indicia, general or public indicia, etc.), such as inkjet printing, laser printing, direct thermal printing, thermal transfer, et cetera. The indicia may be printed simultaneously (e.g., both sides of the label 100' may receive indicia with a single pass through a printer) or the label 100' may use multiple passes through a printer to print the indicia on both of the face plies 102', 103'.

Then, at step 206' (and shown in FIG. 9A), the first adhesive layer 108A' is readied for application of the label 100' to the substrate 50. For instance, the user may remove the lower perimeter portion 100P''' of the second face ply 103' to expose part of the first adhesive layer 108A'. In other embodiments, the first adhesive layer 108A' may be pre-exposed, such as when the label 100' is constructed without the lower perimeter portion 100P'''. Then, at step 208' (and shown in FIG. 9B), the exposed portion of the first adhesive layer 108A' may be used to adhere the label 100' to the substrate 50. In this way, the indicia printed on the first face ply 102' may be available for viewing, while the indicia printed on the second face ply 103' may be hidden by virtue of being sandwiched between the label 100' and the substrate 50.

The receiver of the substrate 50 (or another user) may then, at step 210', remove the tear away portion 101' from the label 100'. The tear away portion 101' may be removed by exploiting the shoulders 109' and the lines of weakness 106'. Then, at step 212' (as seen in FIG. 9C), the central portions 107A', 107B' of the label 100' may be removed from the rest of the label 100' along the lines of weakness 106'. The upper perimeter portion 100P'' of the label 100' may be left adhered to the substrate 50 as a result.

Next, at step 214' (and seen in FIG. 9D), the user may separate the first face ply 102' from the second face ply 103' using the intermediate liner ply 110'. In other words, the first central portion 107A' may be separated from the second face ply 107B' using the intermediate ply 110'. Because the intermediate liner ply 110' has releasable properties on the one side (e.g., by inherently having releasable properties and/or by having one or more releasable coatings 112'), the intermediate liner ply 110' may indirectly and temporarily join the first face ply 102' and the second face ply 103' together, as discussed above. The intermediate ply 110' may remain with the face ply 102' or 103' to which it was fixedly adhered to. As a result, the adhesive layer 108A' or 108B' attached to the separated face ply 102' or 103', respectively, may now be exposed for further adhesion to a surface. Then, at step 216' (and seen in FIG. 9E), the user may adhere the first central portion 107A' to the same or another substrate 50. For instance, the first adhesive layer 108A' associated with the first face ply 102' may be exposed by removing the liner ply 110' and brought into contact with the substrate 50.

It is understood that the steps of the method 200' may be modified, added to, and/or omitted as desired. For example, the step of separating and applying a plurality of central portions 107A', 107B' may be added in embodiments where the label 100' includes multiple central portions 107A', 107B'. As another example, the steps of separating the second central portion 107B' from the liner ply 110' and reapplying the second central portion 107B' via the second adhesive layer 108B' to the same or another substrate 50 may be included where the second face ply 103' is instead releasably secured to the liner ply 110'.

In use, the label 100' may provide for a label that may be printed on both a front and a back side. When applied to the substrate 50, the indicia printed on the second face ply 103' may be obscured. The user may use the shoulders 109' and the tear away portion 101' to remove the central portions 107A', 107B' of the label 100', leaving behind the upper perimeter portion 100P'' of the label 100'. Once removed, the indicia that was previously obscured may now be viewed by the user. In embodiments, the bottom 100B' of the second central portion 107B' may have no appreciable adhesion, and the label 100' is secured to the substrate 50 only by way of that part of the first adhesive layer 108A' that is exposed once the lower perimeter portion 100P''' is removed. In this way, the central portions 107A', 107B' themselves may not be fixedly secured to the substrate 50 upon initial application of the label 100' to the substrate 50. Thus, the central portions 107A', 107B' may be readily removed from the label 100' and the substrate 50 once the lines of weakness 106' are broken. The central portions 107A' or 107B' may be subsequently attached to the same or another surface.

Embodiments of the label 100' described herein may provide for a label that may allow portions thereof to be reapplicable. Because only one side of the liner ply 110' may have a releasable coating 112', only one of the face plies 102' and 103' may be separable therefrom. Therefore, only one of the face plies 102' or 103' may be re-adherable. Meanwhile the other portion (i.e., comprising a face ply fixedly adhered to the liner layer by an adhesive layer) may be advantageously printable upon. Due to the intervening adhesive layer, the face ply that is fixedly adhered to the liner ply may be printed upon without damaging or otherwise interfering with the liner ply. Printing directly upon the liner ply to simulate the effects of double-sided printing (e.g., with a conventional single sided label having a face ply and an opposing liner ply) may, for example, damage the releasable coating of the liner ply, thereby reducing its efficacy. Embodiments of the label 100' described herein may provide for a separable label that may receive double sided printing without having to use complex, costly, specially designed liner layers that directly receive printing. Further, the cost and difficulty of manufacturing the label 100' embodiments may be kept relatively low by only having to use a single releasable coating on the liner ply.

Fixedly adhering a face ply to the liner ply may also advantageously modify characteristics of the face ply. For instance, the liner ply may reinforce the face ply it is fixedly adhered to. As another example, adhering a face ply to a liner ply may allow a greater range of types of printing to be used to print indicia on a label backside.

Embodiments of the label 100' described herein may provide for a label that may be advantageously printed on both sides (e.g., simultaneously or in sequence). The label 100' embodiments described herein may also provide for a label that advantageously reduces the amount of liner waste associated with conventional labels. For instance, the label 100' described herein may utilize only a single liner layer for what equates to two labels (i.e., the first face ply 102' and the second face ply 103' may be provided with different indicia, and at least one of the face plies 102', 103' may be applied separately from the other). Relative to conventional labels, embodiments of the label 100' described herein may use half the amount of liner layers for the same amount of labels. This means that the label 100' may advantageously have a reduced cost (e.g., materials cost, construction cost) compared to conventional labels. Reducing the amount of liner layers may also reduce the environmental impact of liner waste. Further, by requiring only a single liner layer in embodiments, the label 100' may provide for a duplex label that is relatively thin. A relatively thin label may be advantageous because the thin label takes up less space when stored (e.g., on a label roll or in a label stack) when compared to a relatively thicker label. This may provide a reduced cost in storing and/or transporting the thinner label.

Thus, as has been described, the duplex label with single sided intermediate liner layer concepts disclosed herein may serve to minimize traditional liner and releasable coating usage, and in so doing, provide a duplex label that is relatively more environmentally friendly. Moreover, the duplex labels using the intermediate liner concepts disclosed herein may provide for a label that is versatile and usable in many different types of applications and configurations.

The artisan will understand that the duplex label with intermediate liner layer embodiments disclosed herein may include or have associated therewith electronics (e.g., a conveyor device, a label application system, a label assembling system, a printer, et cetera). The electronics may be used to control and modify the operation of the various label assembling or application systems (e.g., to change the timing of the systems, to turn the systems on and off, to dynamically control the systems in response to a sensor detection, et cetera). In some example embodiments, processor or processors used may be configured through particularly configured hardware, such as an application specific integrated circuit (ASIC), field-programmable gate array (FPGA), etc., and/or through execution of software to allow the various electronics to function in accordance with the disclosure herein.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. Not all steps listed in the various figures need be completed in the specific order described.

The invention claimed is:

1. A duplex label system, comprising:

a first face ply;

a second face ply;

a liner ply having a top side and a bottom side; the top side being secured to the first face ply using a first adhesive layer; the bottom side being secured to the second face ply using a second adhesive layer and a releasable coating, the top side being devoid of any releasable coating;

lines of weakness extending through the duplex label system, the lines of weakness forming a first central portion, a first perimeter portion, a second central portion, and a second perimeter portion; the first central portion comprising an inboard portion of the first face ply inboard the lines of weakness; the first perimeter portion comprising an outboard portion of the first face ply outboard the lines of weakness; the second central portion comprising each of inboard portions of the second face ply and the liner ply inboard the lines of weakness; the second perimeter portion comprising each of outboard portions of the second face ply and the liner ply outboard the lines of weakness;

a tear strip adjacent both the first central portion and the second central portion; and a shoulder region adjacent the tear strip, the shoulder region comprising an exposed section of the second perimeter portion while being devoid of the first perimeter portion, the shoulder region being accessible by a user prior to the tear strip being removed;

wherein:

disassociation of the second perimeter portion from the duplex label system exposes the first adhesive layer associated with the first perimeter portion for securing the first perimeter portion to a substrate;

the first central portion and the second central portion are collectively removable from the substrate such that the first perimeter portion remains secured to the substrate;

the inboard portion of the second face ply is adhesively securable to a second substrate after the inboard portion of the second face ply is separated from the inboard portion of the liner ply and the first central portion; and a top area of the first face ply has a non-linear edge which leaves the liner ply exposed for viewing from a front side of the duplex label system.

2. The duplex label system of claim 1, wherein the duplex label system has release material only on the bottom side of the liner ply.

3. The duplex label system of claim 1, wherein the liner ply is permanently secured to the first face ply via the first adhesive layer.

4. The duplex label system of claim 1, wherein the first face ply and the second face ply are made of paper.

5. The duplex label system of claim 1, wherein the first face ply and the second face ply are made of polyester.

6. A duplex label system, comprising:

a first face ply;

a second face ply;

a liner ply having a top side and a bottom side; an entirety of the top side being releasably secured to the first face ply using a first adhesive layer and a releasable coating; an entirety of the bottom side being fixedly secured to the second face ply using a second adhesive layer, the bottom side being devoid of any releasable coating;

a tear strip extending through a top area of the first face ply, the second face ply, and the liner ply;

a first set of lines of weakness extending through the duplex label system, the first set of lines of weakness forming a first central portion and a first perimeter portion; the first central portion comprising an inboard portion of the first face ply inboard the first set of lines of weakness; the first perimeter portion comprising an outboard portion of the first face ply outboard the first set of lines of weakness;

a second set of lines of weakness extending through the duplex label system, the second set of lines of weakness forming a second central portion and a second perimeter portion; the second central portion comprising each of inboard portions of the second face ply and the liner ply inboard the second set of lines of weakness; the second perimeter portion comprising each of outboard portions of the second face ply, the second adhesive layer, and the liner ply outboard the second set of lines of weakness; and a shoulder adjacent the tear strip, the shoulder being a region comprising both the second face ply and the liner ply while being devoid of the first face ply, the shoulder being accessible by a user prior to the tear strip being removed;

wherein:

disassociation of the second perimeter portion from the duplex label system exposes the first adhesive layer associated with the first perimeter portion for securing the first perimeter portion to a substrate;

the first central portion and the second central portion are collectively removable from the substrate such that the first perimeter portion remains secured to the substrate;

the inboard portion of the first face ply is adhesively securable to a second substrate after the inboard portion of the first face ply is separated from the inboard portion of the liner ply and the second central portion; and the shoulder extends from an outer edge of the duplex label system to one of the first set of lines of weakness and the second set of lines of weakness.

7. The duplex label system of claim 6, wherein the first central portion extends a full length of the duplex label system.

8. The duplex label system of claim 6, wherein the duplex label system has release material only on the top side of the liner ply.

9. The duplex label system of claim 6, wherein a top end of the duplex label system is non-linear.

10. The duplex label system of claim 9, wherein the top end is wavy.

11. The duplex label system of claim 6, wherein the first face ply and the second face ply are made of paper.

12. The duplex label system of claim 6, wherein the first face ply and the second face ply are made of polyester.

13. A method of using a duplex label system, comprising:

providing the duplex label system, comprising:

a first face ply;

a second face ply;

a liner ply having a top side and a bottom side; the top side being secured to the first face ply using a first adhesive layer; the bottom side being secured to the second face ply using a second adhesive layer and a releasable coating, the top side being devoid of any releasable coating;

lines of weakness extending through the duplex label system, the lines of weakness forming a first central portion, a first perimeter portion, a second central portion, and a second perimeter portion; the first central portion comprising an inboard portion of the first face ply inboard the lines of weakness; the first perimeter portion comprising an outboard portion of the first face ply outboard the lines of weakness; the second central portion comprising each of inboard portions of the second face ply and the liner ply inboard the lines of weakness; and the second perimeter portion comprising each of outboard portions of the second face ply and the liner ply outboard the lines of weakness a tear strip adjacent both the first central portion and the second central portion; and a shoulder region adjacent the tear strip, the shoulder region comprising an exposed section of the second perimeter portion while being devoid of the first perimeter portion, the shoulder region being accessible by a user prior to the tear strip being removed;

wherein:

disassociation of the second perimeter portion from the duplex label system exposes the first adhesive layer associated with the first perimeter portion for securing the first perimeter portion to a substrate;

the first central portion and the second central portion are collectively removable from the substrate such that the first perimeter portion remains secured to the substrate;

the inboard portion of the second face ply is adhesively securable to a second substrate after the inboard portion of the second face ply is separated from the inboard portion of the liner ply and the first central portion; and a top area of the first face ply has a non-linear edge which leaves the liner ply exposed for viewing from a front side of the duplex label system;

disassociating the second perimeter portion from the duplex label system to expose the first adhesive layer associated with the first perimeter portion;

securing the first perimeter portion to a substrate;

disassociating the first central portion and the second central portion from the substrate along the lines of weakness;

separating the inboard portion of the second face ply from the first central portion and the inboard portion of the liner ply; and adhesively securing the inboard portion of the second face ply to a second substrate.

14. The method of claim 13, further providing releasable material only on the bottom side of the liner ply.

15. The method of claim 13, wherein the first central portion comprises a shipping label and a gift card.

16. The method of claim 13, wherein the lines of weakness extend a full length of the duplex label system.

17. The method of claim 13, wherein the non-linear edge is wavy a wavy surface.

* * * * *